US012664021B1

(12) United States Patent
Norbutas et al.

(10) Patent No.: US 12,664,021 B1
(45) Date of Patent: Jun. 23, 2026

(54) AGENTIC INTERMEDIARY FOR MANAGING AI PROVIDERS

(71) Applicant: Spectra tech, UAB, Vilnius (LT)

(72) Inventors: Emanuelis Norbutas, Vilnius (LT);
Tomas Okmanas, Vilnius (LT);
Gediminas Lisauskas, Vilnius (LT)

(73) Assignee: Spectra tech, UAB, Vilnius (LT)

( * ) Notice: Subject to any disclaimer, the term of this patent is extended or adjusted under 35 U.S.C. 154(b) by 0 days.

(21) Appl. No.: 19/199,240

(22) Filed: May 5, 2025

Related U.S. Application Data

(63) Continuation of application No. 19/089,333, filed on Mar. 25, 2025.

(60) Provisional application No. 63/736,242, filed on Dec. 19, 2024.

(51) Int. Cl.
G06F 9/50 (2006.01)

(52) U.S. Cl.
CPC .................................. G06F 9/5027 (2013.01)

(58) Field of Classification Search
CPC .................................................... G06F 9/5027
See application file for complete search history.

(56) References Cited

U.S. PATENT DOCUMENTS

| | | | | |
|---|---|---|---|---|
| 10,713,143 | B1 * | 7/2020 | Vemulapati ........... | G06F 9/5055 |
| 12,254,279 | B1 | 3/2025 | Cohen et al. | |
| 12,292,811 | B1 * | 5/2025 | Deb ....................... | G06F 9/5055 |
| 12,306,834 | B1 | 5/2025 | Ferchau et al. | |

| | | | | |
|---|---|---|---|---|
| 2018/0365435 | A1 | 12/2018 | Anandam et al. | |
| 2019/0081950 | A1 | 3/2019 | Baracaldo Angel et al. | |
| 2019/0362222 | A1 * | 11/2019 | Chen ................... | G06F 11/3476 |
| 2020/0044990 | A1 | 2/2020 | Zhao et al. | |
| 2020/0394466 | A1 * | 12/2020 | Jia ........................... | G06F 16/55 |
| 2022/0245099 | A1 | 8/2022 | Viswanathan et al. | |
| 2024/0013050 | A1 * | 1/2024 | Pal ........................ | G06N 3/063 |
| 2024/0037646 | A1 | 2/2024 | Sheikh et al. | |
| 2024/0062112 | A1 | 2/2024 | Nezami et al. | |
| 2024/0282452 | A1 | 8/2024 | Tyagi et al. | |
| 2024/0370339 | A1 | 11/2024 | Statton et al. | |
| 2025/0021844 | A1 | 1/2025 | Zalmanson et al. | |
| 2025/0036670 | A1 * | 1/2025 | Cheng ................. | G06F 16/3344 |
| 2025/0053391 | A1 | 2/2025 | Upadhyay et al. | |
| 2025/0053876 | A1 | 2/2025 | Upadhyay et al. | |
| 2025/0110976 | A1 | 4/2025 | Channapattan et al. | |
| 2025/0138909 | A1 * | 5/2025 | Mahajan ................ | G06N 20/20 |

(Continued)

FOREIGN PATENT DOCUMENTS

WO          2026016120 A1      1/2026

OTHER PUBLICATIONS

Gozluklu, Burak, "How task decomposition and smaller LLMs can make AI more affordable". Available at https://www.amazon.science/blog/how-task-decomposition-and-smaller-llms-can-make-ai-more-affordable. Available on Sep. 19, 2024 (Year: 2024).*

(Continued)

*Primary Examiner* — Michael W Ayers
(74) *Attorney, Agent, or Firm* — Young Basile Hanlon & MacFarlane, P.C.

(57) ABSTRACT

A request for completion by an artificial intelligence (AI) model is received. Tasks required to fulfill the request are identified. An AI model is selected based on the tasks and capabilities of the AI model. The request is transmitted to the selected AI model. A response is received from the AI model. The response is then transmitter to a requester.

20 Claims, 9 Drawing Sheets

(56) References Cited

U.S. PATENT DOCUMENTS

2025/0258852 A1    8/2025  Crabtree et al.
2025/0322175 A1*  10/2025  Richards ................ G06F 40/56

OTHER PUBLICATIONS

Unify AI, Build AI Your Way, <https://unify.ai/> Retrieved from Internet Dec. 17, 2024, 8 pages.

Martian, Higher performance and lower cost than any single LLM, <https://withmartian.com/> Retrieved from Internet Dec. 17, 2024, 6 pages.

Nvidia Ai, <https://www.nvidia.com/en-us/#referrer=octoai/> Retrieved from Internet Dec. 17, 2024, 10 pages.

Anyscale, Anyscale's LLM Suite, <https://www.anyscale.com/product/platform/llm-suite> Retrieved from Internet Dec. 17, 2024, 11 pages.

Aporia, Guardrails pricing, <https://www.aporia.com/pricing/> Retrieved from Internet Dec. 17, 2024, 6 pages.

Aguru, Observe and Master Your LLM Behavior End-to-End, <https://aguru.com/> Retrieved from Internet Dec. 17, 2024, 10 pages.

Together.ai, together.pricing, <https://www.together.ai/pricing> Retrieved from Internet Dec. 17, 2024, 6 pages.

Sentry, LLM Monitoring (Beta), <https://sentry.io/for/llm-monitoring/> Retrieved from Internet Dec. 17, 2024, 6 pages.

Lunary, Take your AI chatbot to the next level, <https://lunary.ai/> Retrieved from Internet Dec. 17, 2024, 11 pages.

LangSmith, Get your LLM app from prototype to production, <https://www.langchain.com/langsmith> Retrieved from Internet Dec. 17, 2024, 20 pages.

Portkey, Control Panel for AI Apps, <https://portkey.ai/> Retrieved from Internet Dec. 17, 2024, 6 pages.

Helicone, Ship your AI app with confidence, <https://www.helicone.ai/> Retrieved from Internet Dec. 17, 2024, 14 pages.

Traceloop, The only way to monitor LLMs, <https://www.traceloop.com/> Retrieved from Internet Dec. 17, 2024, 9 pages.

Github, lm-sys / RouteLLM, <https://github.com/lm-sys/RouteLLM> Retrieved from Internet Dec. 17, 2024, 10 pages.

LiteLLM—Getting Started, <https://docs.litellm.ai/> Retrieved from Internet Dec. 17, 2024, 6 pages.

Github, stanford-futuredata / FrugalGPT, <https://github.com/stanford-futuredata/FrugalGPT> Retrieved from Internet Dec. 17, 2024, 4 pages.

\* cited by examiner

450

500

502

RECEIVE CLIENT REQUEST

504

ANALYZE REQUEST REQUIREMENTS

506

RETRIEVE CLIENT-DEFINED PARAMETERS

508

VALIDATE SECURITY REQUIREMENTS

510

EVALUATE MODELS BASED ON REQUIREMENTS

512

ROUTE REQUEST TO MODEL(S)

514

TRASMIT RESPONSE TO REQUESTER

Figure 6:
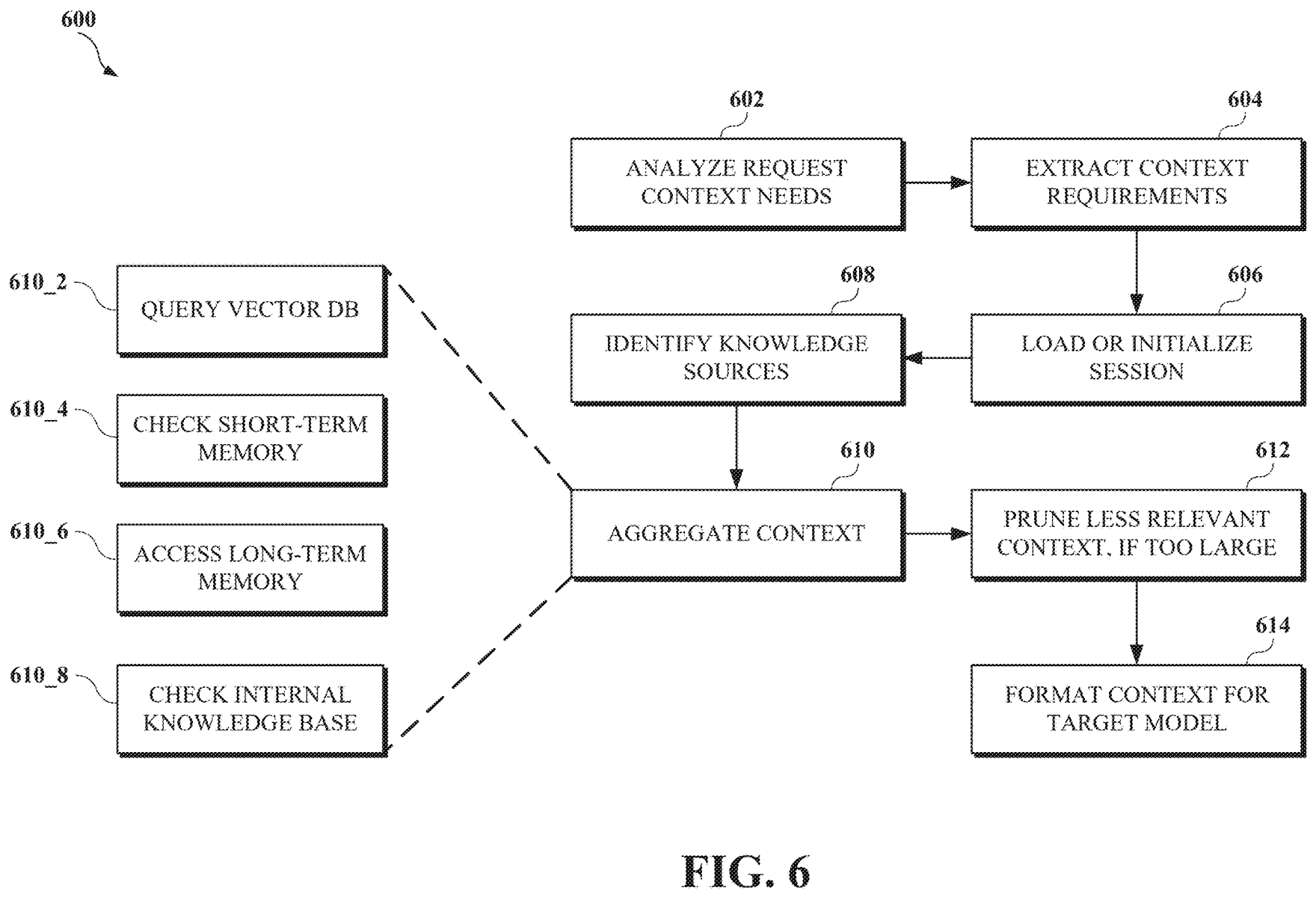

600

602 ANALYZE REQUEST CONTEXT NEEDS

604 EXTRACT CONTEXT REQUIREMENTS

606 LOAD OR INITIALIZE SESSION

608 IDENTIFY KNOWLEDGE SOURCES

610 AGGREGATE CONTEXT

612 PRUNE LESS RELEVANT CONTEXT, IF TOO LARGE

614 FORMAT CONTEXT FOR TARGET MODEL

610_2 QUERY VECTOR DB

610_4 CHECK SHORT-TERM MEMORY

610_6 ACCESS LONG-TERM MEMORY

610_8 CHECK INTERNAL KNOWLEDGE BASE

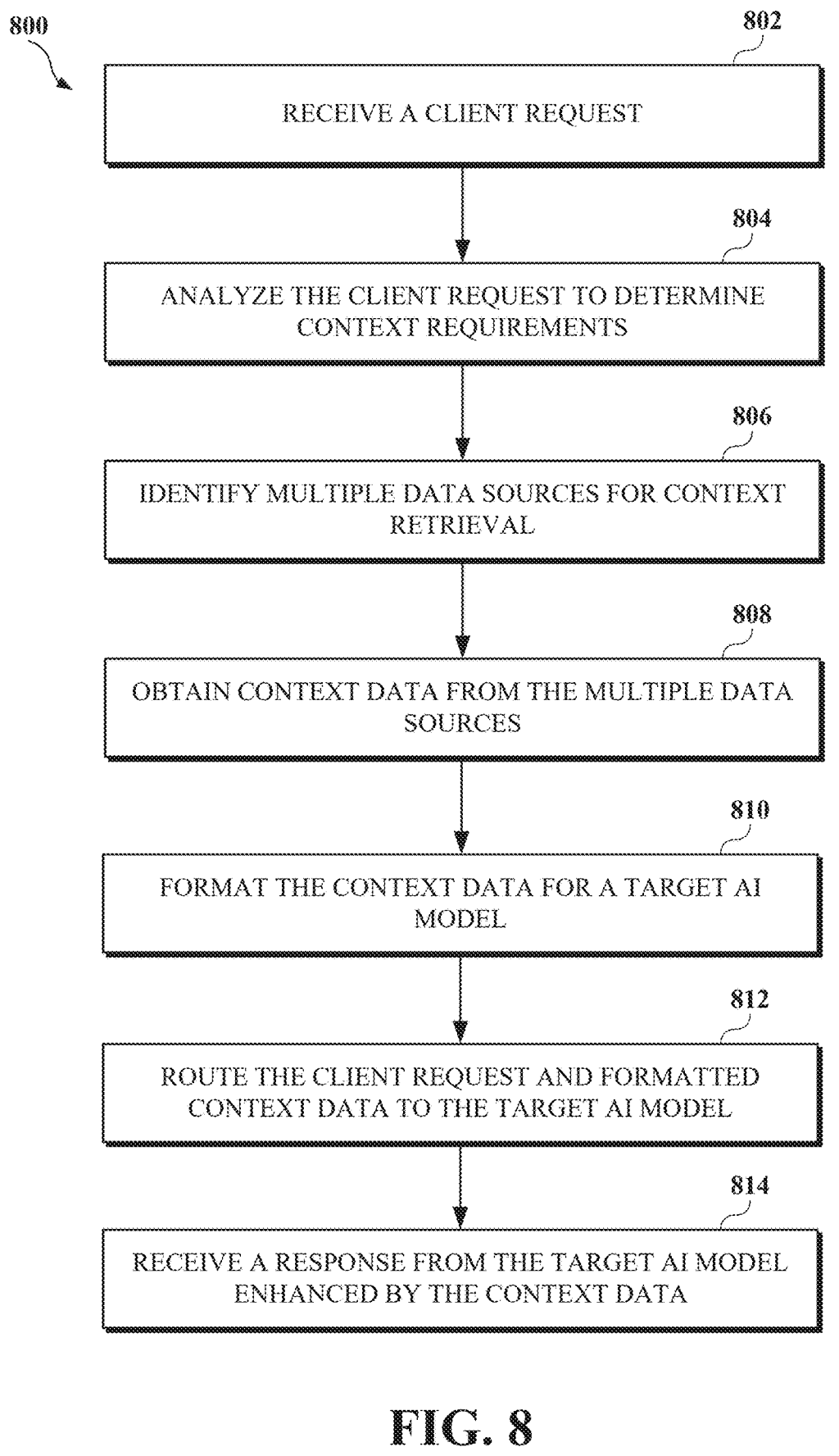

RECEIVE A CLIENT REQUEST

804

ANALYZE THE CLIENT REQUEST TO DETERMINE CONTEXT REQUIREMENTS

806

IDENTIFY MULTIPLE DATA SOURCES FOR CONTEXT RETRIEVAL

808

OBTAIN CONTEXT DATA FROM THE MULTIPLE DATA SOURCES

810

FORMAT THE CONTEXT DATA FOR A TARGET AI MODEL

812

ROUTE THE CLIENT REQUEST AND FORMATTED CONTEXT DATA TO THE TARGET AI MODEL

814

RECEIVE A RESPONSE FROM THE TARGET AI MODEL ENHANCED BY THE CONTEXT DATA

FIG. 8

AGENTIC INTERMEDIARY FOR MANAGING AI PROVIDERS

CROSS REFERENCE TO RELATED APPLICATIONS

This application is a continuation of U.S. patent application Ser. No. 19/089,333, filed Mar. 25, 2025, which claims priority to and the benefit of U.S. Provisional Patent Application Ser. No. 63/736,242, filed Dec. 19, 2024, the entire disclosures of which are incorporated herein by reference.

FIELD

This application relates generally to artificial intelligence (AI) systems and services, and specifically to intermediary systems for managing interactions between client applications and multiple artificial intelligence providers.

SUMMARY

Disclosed herein are one or more examples of implementations of agentic intermediary for managing AI providers.

A first aspect is a method that includes receiving a request for completion by an artificial intelligence (AI) model; identifying tasks required to fulfill the request; selecting an AI model based on the tasks and capabilities of the AI model; transmitting the request to the selected AI model; receiving a response from the AI model; and transmitting the response to a requester.

A second aspect is a system that include a memory subsystem and processing circuitry. The processing circuitry configured to execute instructions stored in the memory system to receive a request for completion by an artificial intelligence (AI) model; identify tasks required to fulfill the request; select an AI model based on the tasks and capabilities of the AI model; transmit the request to the selected AI model; receiving a response from the AI model; and transmit the response to a requester.

A third aspect is one or more non-transitory computer readable media storing instructions operable to cause one or more processors to perform operations that include receiving a request for completion by an artificial intelligence (AI) model; identifying tasks required to fulfill the request; selecting an AI model based on the tasks and capabilities of the AI model; transmitting the request to the selected AI model; receiving a response from the AI model; and transmitting the response to a requester.

A fourth aspect is a method that includes receiving a client request; analyzing the client request to determine context requirements; identifying multiple data sources for context retrieval, where the data sources include at least one of: a short-term memory, a long-term memory, or an internal knowledge base; obtaining context data from the multiple data sources; formatting the context data for a target AI model; routing the client request and formatted context data to the target AI model; and receiving a response from the target AI model enhanced by the context data.

Other embodiments of these aspects include corresponding computer systems, apparatus, and computer programs recorded on one or more computer storage devices, each configured to perform the actions of the methods. One embodiment is a system that includes one or more processors configured to perform one of these methods. One embodiment is a system that includes one or more memories and one or more processors where the one or more processors are configured to execute instructions stored in the one or more memories to perform one of these methods. One embodiment is one or more non-transitory computer-readable storage media that include executable instructions that, when executed by one or more processors, facilitate performance of operations that perform one of these methods.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is a flowchart of a technique for retrieving, processing, and integrating context data from multiple sources to support the fulfillment of AI model requests.

FIG. 8 is a flowchart of a technique for dynamically retrieving, formatting, and integrating context data from multiple sources to enhance the processing of client requests by an AI model.

DETAILED DESCRIPTION

Figure 1:
FIG. 1 is a block diagram of an example of a computing device.
Figure 1:
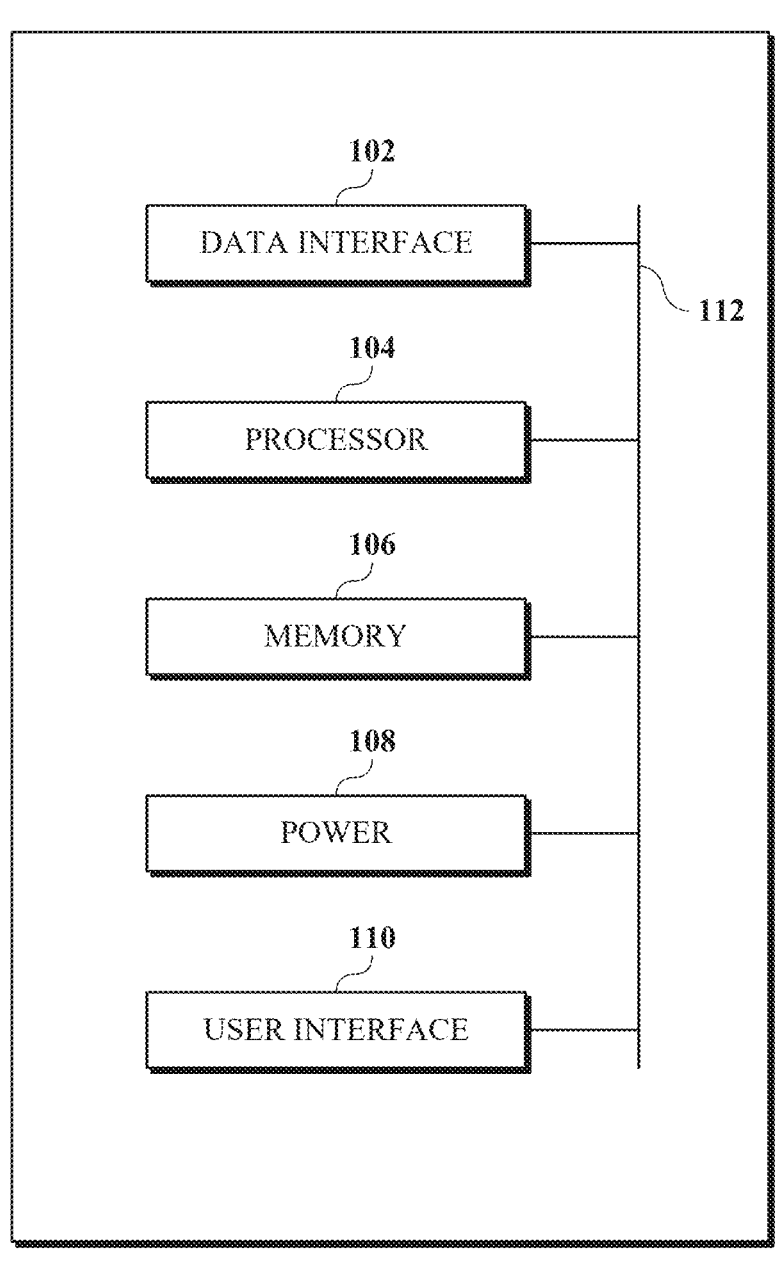

AI technologies, particularly large language models (LLMs) and other AI models, have become increasingly prevalent across various industries and applications. Organizations seeking to leverage these technologies face several challenges in the current landscape. New AI models and providers frequently emerge, each offering unique features and requiring integration. These rapid changes make it difficult for organizations to adapt.

Organizations implementing AI capabilities often need to integrate with multiple AI service providers to ensure reliability and optimal performance across different use cases. However, managing these integrations presents significant technical challenges. For example, AI providers have unique application programming interfaces (API) specifications, require varied integration approaches, and handle context and memory differently. Additionally, organizations must consider factors such as cost optimization, security compliance, and the need to augment AI responses with internal organizational knowledge and data.

Current solutions often lead to tight coupling with specific AI providers, making it difficult to switch providers or leverage multiple providers effectively. While some Artificial-Intelligence as a Service (AIaaS) providers offer comprehensive solutions, these typically lock users into their specific ecosystems, limiting flexibility and potentially increasing costs. Moreover, organizations struggle to dynamically route tasks to optimal models based on real-time constraints like task type, availability, cost, and performance requirements.

Furthermore, as AI capabilities expand beyond simple query-response (e.g., prompt-completion) patterns to include more complex agentic behaviors—where AI systems can take autonomous actions and interact with various tools and services—organizations need more sophisticated orchestration capabilities. This includes managing dependencies among tasks, enabling parallel and sequential operations, and ensuring security and compliance. For example, a system may need to process a request involving multiple subtasks by distributing them to different AI models or tools, sequencing operations, and consolidating responses.

Implementations according to this disclosure solve problems such as these through an agentic AI intermediary (AAII) (also referred to as an AAII system) that provides a unified interface between client systems and multiple external AI providers, tools, and agents. The AAII includes an orchestrating agent that dynamically manages routing of requests, task decomposition, context augmentation, and integration with client systems based on configurable parameters and objectives.

In various implementations, the AAII includes multiple specialized engines working in concert. An AI model routing engine selects optimal AI models from multiple providers based on factors such as task requirements, cost constraints, and real-time availability. A context retrieval and augmentation engine enriches requests with relevant information from client knowledge bases, enabling AI models to provide more accurate and contextually appropriate responses. A security and compliance engine ensures sensitive information is appropriately handled, including anonymizing client data before forwarding it to external providers or processing sensitive requests entirely within the AAII.

The AAII can maintain different types of memory storage, including short-term session data and long-term contextual information. For instance, short-term memory can store chat histories to maintain continuity in user interactions across AI models, while long-term memory retains organizational knowledge for context augmentation. This enables consistent context maintenance even when switching between different AI providers, as the AAII can appropriately format and provide relevant historical context to each provider's specific requirements. Vector databases and embedding engines allow for efficient storage and retrieval of context information, while fine-tuning capabilities enable adaptation of AI models to specific client needs.

The AAII may implement scheduling capabilities that enable asynchronous and autonomous operations, enabling the AAII to handle complex sequences of tasks that may involve multiple AI models, tools, or agents. An evaluation engine may monitor the performance and reliability of external providers, enabling dynamic adjustment of routing decisions based on observed quality metrics. For example, if a provider's response quality declines, the AAII can automatically reconfigure routing to prioritize alternative models.

Through client-defined parameters and objectives, organizations (e.g., users of the AAII) can specify their preferences for model selection, fallback strategies, and integration requirements. The AAII can be configured through management interfaces that provide visibility into telemetry, logs, and performance metrics, enabling organizations to optimize their use of AI services while maintaining control over cost, quality, and security requirements. For instance, an organization could prioritize low-cost models during off-peak hours while reserving high-performance models for critical operations.

To describe some implementations in greater detail, reference is first made to examples of hardware and software structures used to implement an agentic intermediary system for managing, and integrating with, multiple AI providers. FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium. In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hardwired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user.

The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus.

The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

Figure 2:
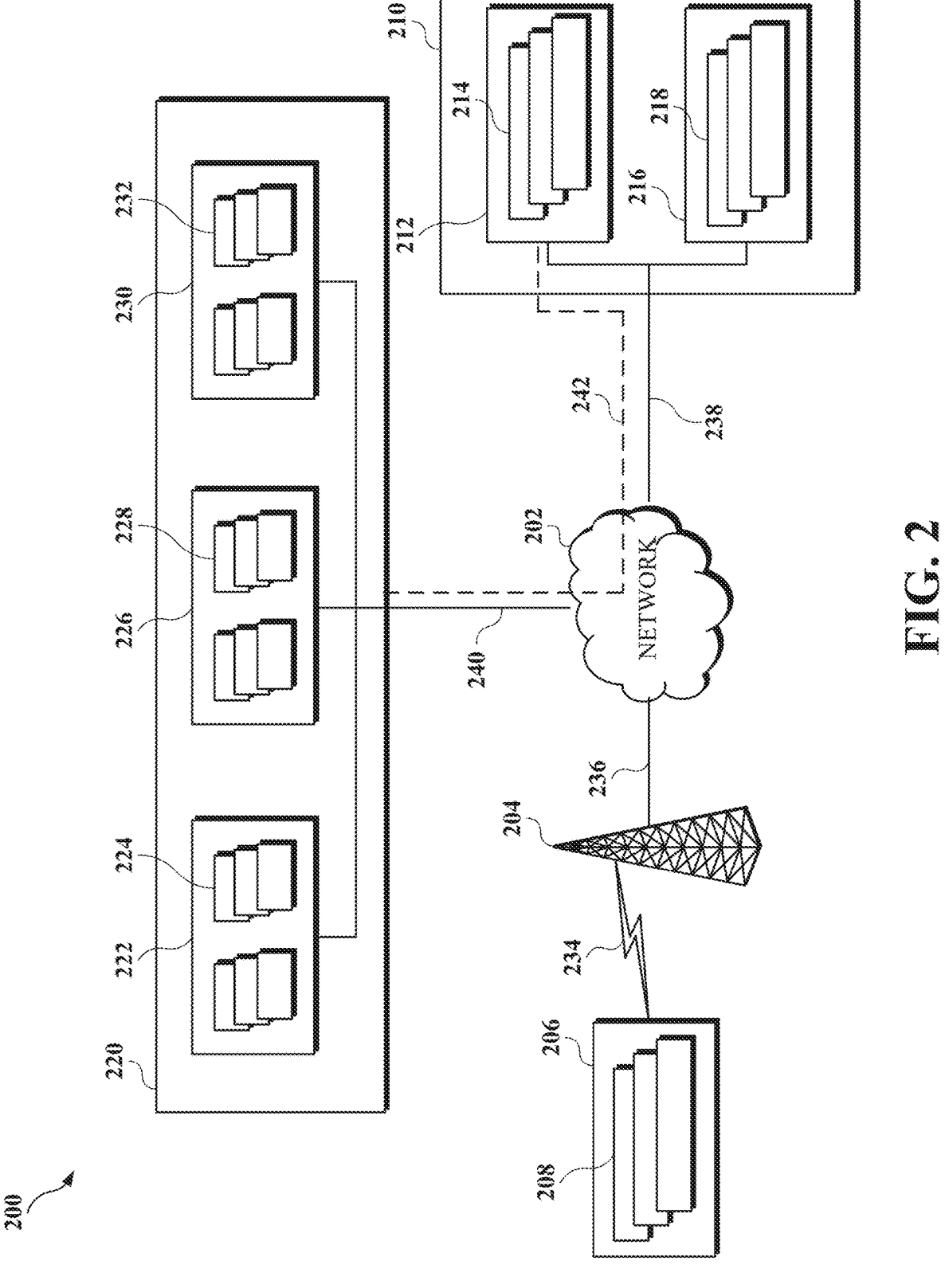
FIG. 2 is a block diagram of an example of a computing and communications system.

FIG. 2 is a diagram of an example of a computing and communications system 200. The computing and communications system 200 includes a first network 202, an access point 204, a first computing and communications device 206, a second network 210, and a third network 220. The second network 210 includes a second computing and communications device 212 and a third computing and communications device 216. The third network 220 includes a fourth computing and communications device 222, a fifth computing and communications device 226, and a sixth computing and communications device 230. Other configurations, including fewer or more computing and communications devices, fewer or more networks, and fewer or more access points, may be used.

One or more of the networks 202, 210, 220 may be, or may include, a local area network (LAN), wide area network (WAN), virtual private network (VPN), a mobile or cellular telephone network, the Internet, or any other means of electronic communication. The networks 202, 210, 220 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 202, 210, 220, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 204 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 204 is shown as a single unit, an access point can include any number of interconnected elements. Although one access point 204 is shown, fewer or more access points may be used. The access point 204 may communicate with other communicating devices via wired or wireless electronic communications links or via a sequence of such links.

As shown, the access point 204 communicates via a first communications link 234 with the first computing and communications device 206. Although the first communications link 234 is shown as wireless, the first communications link 234 may be implemented as, or may include, one or more wired or wireless electronic communications links or a sequence of such links, which may include parallel communications links for multipath communications.

As shown, the access point 204 communicates via a second communications link 236 with the first network 202. Although the second communications link 236 is shown as wired, the second communications link 236 may be implemented as, or may include, one or more wired or wireless electronic communications links or a sequence of such links, which may include parallel communications links for multipath communications.

As shown, the first network 202 communicates with the second network 210 via a third communications link 238. Although the third communications link 238 is shown as wired, the third communications link 238 may be implemented as, or may include, one or more wired or wireless electronic communications links or a sequence of such links, which may include parallel communications links for multipath communications.

As shown, the first network 202 communicates with the third network 220 via a fourth communications link 240. Although the fourth communications link 240 is shown as wired, the fourth communications link 240 may be implemented as, or may include, one or more wired or wireless electronic communications links or a sequence of such links, which may include parallel communications links for multipath communications.

The computing and communications devices 206, 212, 216, 222, 226, 230 are, respectively, computing devices, such as the computing device 100 shown in FIG. 1. For example, the first computing and communications device 206 may be a user device, such as a mobile computing device or a smartphone, the second computing and communications device 212 may be a user device, such as a laptop, the third computing and communications device 216 may be a user device, such as a desktop, the fourth computing and communications device 222 may be a server, such as a database server, the fifth computing and communications device 226 may be a server, such as a cluster or a mainframe, and the sixth computing and communications device 230 may be a server, such as a web server.

The computing and communications devices 206, 212, 216, 222, 226, 230 communicate, or exchange data, such as voice communications, audio communications, data communications, video communications, messaging communications, broadcast communications, or a combination thereof, with one or more of the other computing and communications devices 206, 212, 216, 222, 226, 230 respectively using one or more of the networks 202, 210, 220, which may include communicating using the access point 204, via one or more of the communications links 234, 236, 238, 240.

For example, the first computing and communications device 206 may communicate with the second computing and communications device 212, the third computing and communications device 216, or both, via the first communications link 234, the access point 204, the second communications link 236, the network 202, the third communications link 238, and the second network 210. The first computing and communications device 206 may communicate with one or more of the third computing and communications device 222, the fourth computing and communications device 226, the fifth computing and communications device 226, via the first communications link 234, the access point 204, the second communications link 236, the network 202, the fourth communications link 240, and the third network 220.

For simplicity and clarity, the sequence of communications links, access points, networks, and other communications devices between a sending communicating device and a receiving communicating device may be referred to herein as a communications path. For example, the first computing and communications device 206 may send data to the second computing and communications device 212 via a first communications path, or via a combination of communications paths including the first communications path, and the second computing and communications device 212 may send data to the first computing and communications device 206 via the first communications path, via a second communications path, or via a combination of communications paths, which may include the first communications path.

The first computing and communications device 206 includes, such as executes, performs, or operates, one or more applications or services 208. The second computing and communications device 212 includes, such as executes, performs, or operates, one or more applications or services 214. The third computing and communications device 216 includes, such as executes, performs, or operates, one or more applications or services 218. The fourth computing and communications device 222 includes, such as stores, hosts, executes, performs, or operates, one or more documents, applications or services 224. The fifth computing and communications device 226 includes, such as stores, hosts, executes, performs, or operates, one or more documents, applications, or services 228. The sixth computing and communications device 230 includes, such as stores, hosts, executes, performs, or operates, one or more documents, applications or services 232.

In some implementations, one or more of the computing and communications devices 206, 212, 216, 222, 226, 230 may communicate with one or more other computing and communications devices 206, 212, 216, 222, 226, 230, or with one or more of the networks 210, 220, via a virtual private network. For example, the second computing and communications device 212 is shown as communicating with the third network 220, and therefore with one or more of the computing and communications devices 222, 226, 230 in the third network 220, via a virtual private network 242, which is shown using a broken line to indicate that the virtual private network 242 uses the first network 202, the third communications link 238, and the fourth communications link 240.

In some implementations, two or more of the computing and communications devices 206, 212, 216, 222, 226, 230 may be in a distributed, or clustered, configuration. For example, the third computing and communications device 222, the fourth computing and communications device 226, and the fifth computing and communications device 226 may, respectively, be elements, or nodes, in a distributed configuration.

In some implementations, one or more of the computing and communications devices 206, 212, 216, 222, 226, 230 may be a virtual device. For example, the third computing and communications device 222, the fourth computing and communications device 226, and the fifth computing and communications device 226 may, respectively, be virtual devices operating on shared physical resources.

Figure 3:
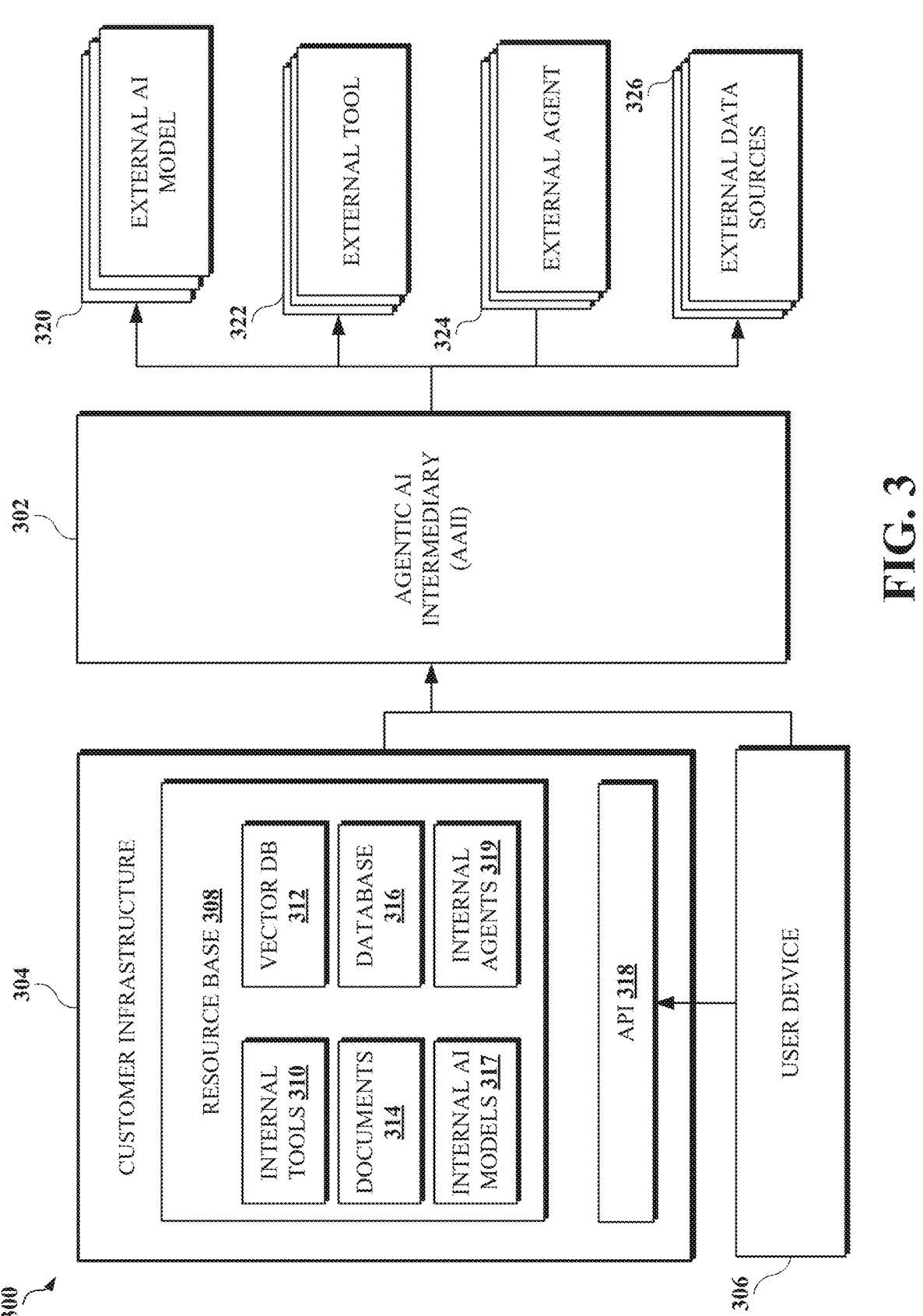
FIG. 3 is a high-level diagram of a system for managing and interacting with multiple AI providers.

FIG. 3 is a high-level diagram of a system 300 for managing and interacting with multiple AI providers. An AAII 302 provides services to a customer (e.g., an organization), which manages a customer infrastructure 304. One or more applications of the customer infrastructure 304 may be accessible to users (internal and/or external to the customer infrastructure 304) via user devices, such as a user device 306.

The AAII 302 acts as an intelligent intermediary between the customer infrastructure 304 (e.g., applications deployed therein) and various external AI that implement or provide external AI models 320, external tool providers that implement or provide external tools 322, external agent providers that provide or implement external agents 324, and/or external data providers that provide or implement external data sources 326. The term "external" indicates that these AI models, tools, and agents are provided or implemented by systems, platforms, or services outside the direct control of the customer infrastructure 304 or the AAII 302 itself. The AAII 302 dynamically selects and orchestrates these external resources to fulfill client requests, optimize performance, and enhance AI capabilities.

The components shown in FIG. 3 may be implemented using the computing and communications infrastructure described with respect to FIG. 2. The user device 306 may be the user device 206 of FIG. 2. The customer infrastructure 304 may be implemented across one or more networks, such as the second network 210 of FIG. 2, with various components distributed across computing devices such as the computing and communications devices 212, 216 shown in FIG. 2. The AAII 302 may be implemented across multiple computing and communications devices in a distributed configuration, such as the computing and communications devices 222, 226, 230 shown in the third network 220 of FIG. 2. The external AI models 320, the external tools 322, the external agents 324, and the external data sources 326 may be hosted on computing and communications devices in separate networks, such as the third network 220 of FIG. 2, with different providers' services running on computing and communications devices similar to devices 222, 226, and 230 shown in FIG. 2.

Client requests can vary in complexity and may include multiple tasks for completion by an AI model. A client request can be received as a discrete request or as a continuous stream of data such as text, audio, video, or other formats. For example, a client request might come from a voice call or real-time video feed. Client requests might include simple or complex queries requiring direct AI model responses. Examples of requests include, but are not limited to, checking the current shipping status for an order; document generation tasks, such as drafting correspondence requesting information; complex multi-step operations, such as analyzing sales data and generating reports; and interactive sessions requiring context maintenance, such as customer service chatbot conversations that need to maintain context across multiple exchanges.

For complex requests, the AAII 302 can analyze and decompose them into component tasks. Using the sales data analysis example, the AAII 302 might break this down into data retrieval and analysis, requiring access to one or more components of an internal resource base (e.g., the resource base 308), such as a database 316 or internal tools 310, and potentially an AI model specialized in data analysis. Report generation might require a language model capable of narrative generation, while scheduling actions might require access to external tools, such as the external tool 322, for email and calendar management.

The AAII 302 selects appropriate external resources based on multiple criteria. These criteria may include the task type and complexity, such as selecting specialized AI models for specific tasks like data analysis or natural language generation; performance requirements, such as meeting response time and accuracy thresholds; cost considerations, such as choosing less expensive models for simple tasks while reserving advanced models for more demanding operations; resource availability, such as falling back to alternative providers if primary services are unavailable; and context requirements, such as selecting models capable of handling longer context windows for tasks requiring extensive background information.

This dynamic selection and routing enable efficient handling of varying types of requests, from simple chatbot interactions to more complex multi-step operations requiring coordination of multiple external services. The AAII 302 can orchestrate these resources in parallel or in sequence as needed to fulfill the client's requirements while optimizing for factors such as cost, performance, and reliability.

The customer infrastructure 304 includes a resource base 308 containing various types of information and systems that may be accessed by or provide resources or data to the AAII 302. The resource base 308 includes several components, which are further described herein. One example component is internal tools, such as the internal tools 310, that may be used for specific functions like proprietary analytics, internal resource management, or automated workflows. The AAII 302 can access these tools to perform tasks such as retrieving specialized internal data or triggering internal workflows in response to external requests.

The vector database 312 stores embeddings and other data structures used for retrieval-augmented generation (RAG). The AAII 302 uses the vector database 312 to fetch contextually relevant information dynamically, improving the accuracy and relevance of responses generated by AI models. Documents, such as the documents 314, may include business documents, contracts, policies, or other records. The AAII 302 can access these documents to retrieve data, extract insights, or provide references for tasks like contract drafting or policy compliance.

Databases, such as the database 316, may store structured data, such as customer records, sales figures, or operational metrics. The AAII 302 may use such data for operations like data analysis, report generation, and personalized responses. The API layer 318 serves as the interface between the AAII 302 and the customer infrastructure 304. It enables the AAII 302 to access internal tools, databases, and other resources dynamically, facilitating seamless integration with the customer's systems. However, there can be other mechanisms via which the AAII 302 can access the customer infrastructure 304.

The external AI models 320 are used by the AAII 302 for AI-related tasks such as natural language processing (e.g., understanding, generation, etc.), image processing (e.g., recognition, understanding, or generation), or data classification, amongst others. The external AI models 320 are dynamically selected based on the specific requirements of each request or task received by the AAII 302. The external tools 322 may include third-party APIs, actuators, or services. The AAII 302 can call these tools to perform actions such as scheduling, payment processing, or interacting with IoT devices, amongst other examples. The external agents 324 may be or refer to autonomous systems or agents capable of performing complex tasks or interacting with other systems. The AAII 302 integrates these agents to expand the range of supported functionalities, such as autonomous problem-solving or real-time decision-making.

The external data sources 326 may provide access to publicly available or licensed third-party data repositories, knowledge bases, and information services that can be utilized by the AAII 302. These external data sources 326 may include public databases, open datasets, industry-specific information repositories, news feeds, academic publications, or other structured and unstructured data collections. The AAII 302 can leverage the external data sources 326 to augment its processing capabilities and/or enhance the context available for AI operations.

The resource base 308 may include internal AI models 317, internal tools 310, and internal agents 319 that the AAII 302 uses similarly to the external AI models 320, the external tools 322, and the external agents 324, respectively.

Figure 4A:
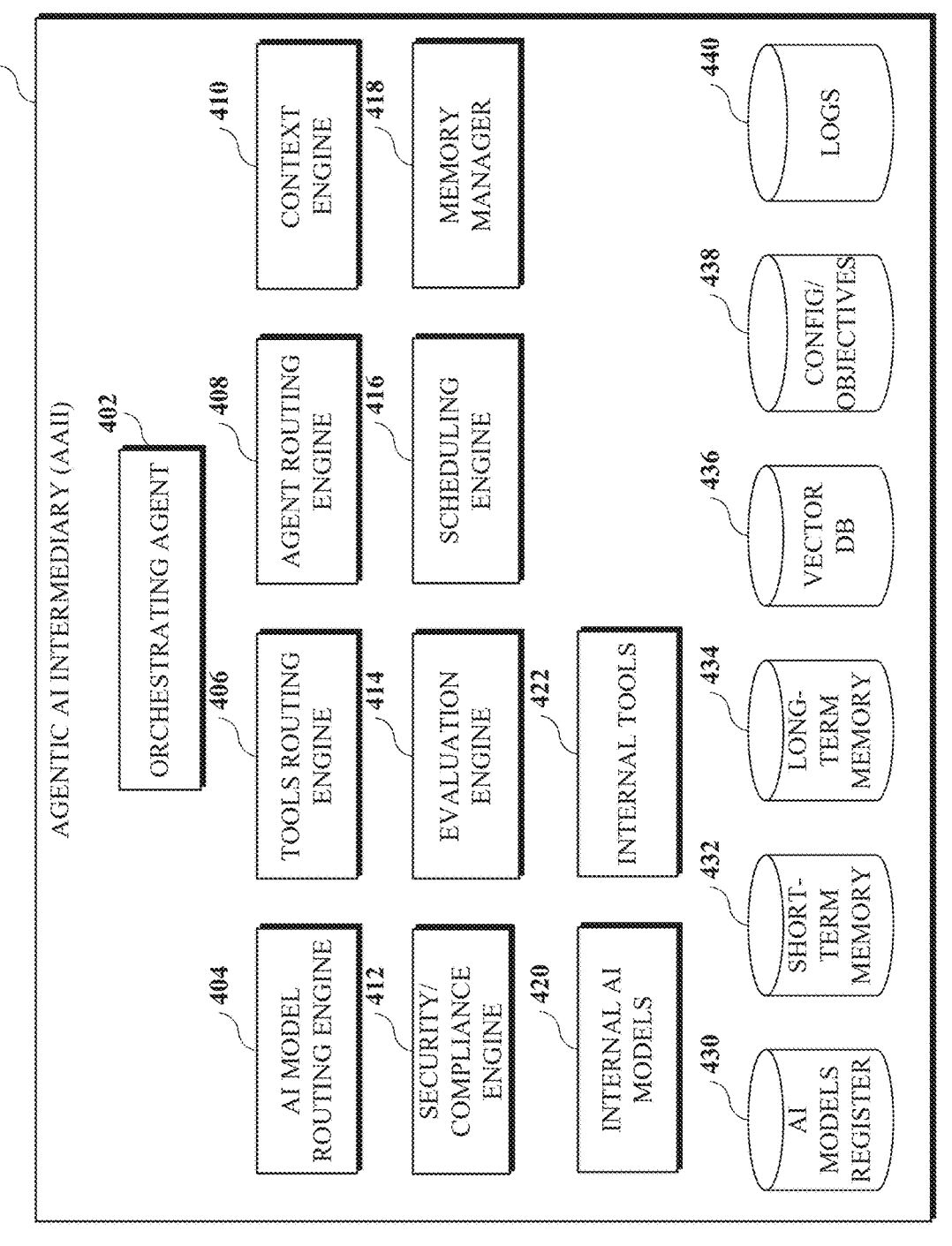
FIG. 4A is a block diagram of example functionality of an agentic AI intermediary (AAII), which may be, for example, the AAII of FIG. 3.

FIG. 4A is a block diagram of example functionality of an AAII 400, which may be, for example, the AAII 302 of FIG. 3. The AAII 400 includes engines, such as tools, modules, programs, subprograms, functions, routines, subroutines, operations, executable instructions, and/or the like for, inter alia and as further described below, managing AI model selection, routing tasks, augmenting context, and coordinating internal and external resources.

At least some of the engines of the AAII 400 can be implemented as respective software programs that may be executed by one or more computing devices. A software program can include machine-readable instructions that may be stored in a memory, and that, when executed by a processor, may cause the computing device to perform the instructions of the software program. These engines are designed to interact with external systems, client infrastructure, and various internal components to achieve intelligent orchestration and seamless integration.

As shown, the AAII 400 includes an orchestrating agent 402, an AI model routing engine 404, a tools routing engine 406, an agent routing engine 408, a context engine 410 (i.e., a context retrieval/augmentation engine), a security/compliance engine 412, an evaluation engine 414, a scheduling engine 416, a memory manager 418, internal AI models 420, and internal tools 422. The AAII 400 may include fewer, more, or other engines. In some implementations, two of more engines may be combined and/or an engine may be split into more than one engine. The AAII 400 is also shown as including data stores including an AI models register 430, a short-term memory 432, a long-term memory 434, a vector database 436, a configuration/objectives database 438, and logs 440. The AAII 400 may include fewer, more, or other data stores. In some implementations, two of more data stores may be combined and/or a data store may be split into more than one data store. The AAII 400 may additionally include caches for rapid access to frequently used data and session stores for maintaining state across multiple related interactions.

The orchestrating agent 402 is the central component of the AAII 400. The orchestrating agent 402 can be thought of as the "brain" of the AAII 400, making intelligent decisions based on predefined rules, dynamic algorithms, and, in some cases, machine learning models. By coordinating the various components of the AAII 400, the orchestrating agent 402 enables the efficient and effective delivery of AI services tailored to client needs.

The orchestrating agent 402 is responsible for receiving client requests from a requester, which may be a human or programmatic user, internal or external to a customer infrastructure, such as the customer infrastructure 304 of FIG. 3. The orchestrating agent 402 analyzes the received requests and determines optimal courses of action to fulfill those requests. This includes dynamically selecting and coordinating various external AI models (such as the one or more of the external AI models 320 of FIG. 3), tools (such as one or more of the external tools 322 of FIG. 3), and agents (such as one or more of the external agents 324 of FIG. 3) based on factors such as task/request requirements, cost constraints, and real-time availability.

The orchestrating agent 402 serves as the primary coordinator, receiving client requests through client-facing APIs and decomposing these requests into individual tasks. For example, in response to a complex request for analyzing sales data and generating a report, the orchestrating agent 402 may direct the context engine 410 to retrieve relevant client data, use the AI model routing engine 404 to select a data analysis model, and employ the tools routing engine 406 to schedule report generation via an external tool.

The orchestrating agent 402 also manages the integration of the AAII 400 with a customer infrastructure (e.g., resources available in the customer infrastructure 304 of FIG. 3 usable for fulfilling the request), enabling access to internal knowledge bases, databases, and/or tools. The orchestrating agent 402 may handle or enable context retrieval and augmentation by leveraging short-term and long-term memory stores or vector databases, stored in the short-term memory 432, the long-term memory 434, or customer vector databases (such as the vector database 312 of FIG. 3), respectively. In some implementations, the vector database 436, if used to also store customer embeddings, may also be used for context retrieval. "Context," as used herein, refers to the information provided as input or inferred from prior interactions that helps an AI model (or other tools or agents) understand and respond accurately to a given query or task. This may include the surrounding text, previous user interactions, embeddings representing relevant knowledge, task-specific instructions, or additional data that frames the meaning and intent of the current input. Context ensures that the model generates coherent, relevant, and informed responses tailored to the specific query or task. As such, the orchestrating agent 402 ensures that AI models receive the necessary information to generate accurate and contextually relevant responses.

The AI model routing engine 404 dynamically selects the most appropriate AI model to process each incoming request. It evaluates factors such as task complexity, real-time availability, cost, and performance metrics to ensure that requests are routed to the optimal AI model for a given task. For example, simple tasks like basic classification may be routed to less resource-intensive AI models, while more complex tasks, such as natural language generation, are directed to high-performance AI models. If a preferred AI model is unavailable or experiencing high latency, the AI model routing engine 404 can dynamically switch to an alternative AI model to maintain uninterrupted service.

The AI model routing engine 404 selects models from the AI models register 430, which catalogs internal and external AI models along with their metadata, capabilities, and performance metrics. The AI model routing engine 404 may also incorporate external AI models dynamically to expand the pool of available AI models for diverse client needs. In some cases, the AI model routing engine 404 routes requests to one of the internal AI models 420, particularly when the internal model is better suited for a specific task. For instance, in a chatbot scenario, a simple "Hi" request from a user may be routed to one of the internal AI models 420 optimized for low-cost, low-complexity responses. This approach minimizes resource utilization and latency while maintaining responsiveness.

The AI model routing engine 404 balances performance requirements with budgetary constraints by considering the cost of using different AI models. Routine tasks may be assigned to less expensive models, while more powerful, costlier models are reserved for complex or critical requests.

Additionally, the engine leverages historical performance data and quality metrics, such as accuracy and latency, to inform its decisions. For example, the AI model routing engine 404 may favor AI models that have demonstrated high reliability and desirable performance characteristics in the past.

The AI model routing engine 404 may implement cost optimization by matching query complexity with appropriate model tiers. To illustrate, simple queries like greeting messages ("hi", "hello") are automatically routed to lightweight, cost-effective models or served from cache, while complex analytical queries are directed to more capable but expensive models. This tiered routing approach ensures optimal resource utilization while maintaining appropriate response quality for each interaction type. The AI model routing engine 404 can dynamically adjust these routing decisions based on real-time monitoring of query patterns and response requirements.

To refine its model selection further, the AI model routing engine 404 collaborates with the evaluation engine 414. The evaluation engine 414 provides feedback on the quality of responses generated by different AI models. The evaluation engine 414 may use feedback collected from both client systems and end-users. End-user feedback can be gathered through various mechanisms, such as ratings collected after completing a full session (e.g., after a chat conversation or voice call) or immediate feedback on individual interactions (e.g., thumbs up/down responses to specific messages). The feedback enables the AI model routing engine 404 to adapt its routing strategies over time. This feedback loop ensures continuous optimization, allowing the system to consistently route requests to the most effective and efficient AI models. The AI model routing engine 404 may use instructions or rules from the orchestrating agent 402, data stored in the configuration/objectives database 438, and information from other engines or data stores, either individually or in combination.

Building upon this evaluation feedback loop, the AI model routing engine 404 may select models dynamically based on a variety of parameters to optimize performance for specific tasks. Purely technical parameters, such as latency, speed, availability, and price, can be used in this selection process. For instance, for real-time applications (e.g., customer service chatbots), the AI model routing engine 404 may prioritize models with low latency and high availability, such as those exhibiting minimal response times (e.g., measured in seconds or tokens per second), while for cost-sensitive operations, models with lower pricing per million tokens may be favored. These technical considerations, informed by the evaluation data, enable the AAII to efficiently route requests to models that meet constraints, including performance and budgetary constraints.

Additionally, the AI model routing engine 404 may incorporate policy-based and AI-specific parameters to guide model selection. Policy-based factors may include geographic computing restrictions (e.g., prioritizing models hosted in specific regions like the United States, the European Union, or Asia), compliance with data privacy requirements (e.g., ensuring models are not trained on user data), or preferences for open-source models or avoiding certain origins (e.g., not made in certain countries or by certain companies). AI-specific capabilities, such as context window size, token limits, specialized abilities (such as tool use, code generation, or visual understanding), and instruction-following capability further refine the selection process. The AI model routing engine 404 may leverage (e.g., use) quality benchmarks and use-case alignment—e.g., evaluating models against standardized language model benchmarks or comparing performance metrics like accuracy, robustness, and context window size—to identify the most suitable model for a given task, thereby aligning with client-defined objectives stored in the configuration/objectives database 438.

To illustrate, in a use case requiring text summarization for legal documents, the AI model routing engine 404 may select a model based on its performance in benchmarks like Massive Multitask Language Understanding (MMLU) for general knowledge or HumanEval (a benchmark dataset that evaluates the performance of LLMs in code generation tasks) for coding proficiency, prioritizing high quality and factual accuracy while adhering to low-latency and data privacy policies. Alternatively, for a code generation task in a software development scenario, the AI model routing engine 404 may choose a model excelling in benchmarks like Berkeley Function Calling Leaderboard or Massive Bash-Python Programming Benchmark (MBPP), optimizing for speed and cost-effectiveness while ensuring the model supports a large context window. Such selection decisions can be continuously refined through the evaluation data provided by the evaluation engine 414, creating an adaptive system that improves its routing decisions over time based on observed performance.

Rules for selecting an appropriate AI model can be applied in various configurations to optimize task fulfillment. One approach includes a static list of models configured through a control panel, where all requests associated with a specific API key are forwarded to the first model in the list. If that model is unavailable or underperforming (e.g., based on latency, accuracy, or availability thresholds), routing may fall back to the next model in the sequence, or requests may be distributed using load-balancing techniques such as random, weighted, or round-robin distribution.

Alternatively, or additionally, the AAII 400 may support rule-based configurations defined in the control panel, thereby leveraging a broader set of parameters to dynamically select an optimal model. These parameters, as previously described, may include technical factors (e.g., latency, speed, price), policy-based constraints (e.g., geographic restrictions, data privacy), AI-specific capabilities (e.g., text generation, reasoning), and quality benchmarks (e.g., MMLU, HumanEval). The AI model routing engine 404 may apply an algorithm or formula, stored in the configuration/objectives database 438, to evaluate and rank models based on such criteria, thereby aligning with client-defined objectives and real-time system conditions, as coordinated by the orchestrating agent 402 and AI model routing engine 404.

Alternatively, or additionally, AI/ML-based model selection may be implemented. The AI/ML-based model selection may optionally incorporate a feedback loop for continuous improvement. In this approach, a small set of predefined rules or targets (e.g., performance thresholds, cost constraints) may guide an embedded AI/ML model, which dynamically decides the optimal model for each request. Historical performance data from the logs 440 and real-time metrics may be used to refine selections over time. Additionally, dynamic client-driven selection may be implemented, where clients specify a provider or model name (or a list of model names) with each API request, or provide needed parameters (e.g., latency requirements, use case) per call, allowing the AAII to route requests accordingly.

Alternatively, or additionally, tagged rulesets may be used, where complex preconfigured scenarios or rulesets are defined and associated with specific tags or names. Clients can select one or more rulesets by name or tag with an API call, enabling tailored model selection for diverse use cases (e.g., text summarization, code generation). These tagged rulesets, managed via the configuration/objectives database 438, can be combined with other selection mechanisms, such as static lists, smarter rules, or AI/ML-based selection, to create hybrid strategies that adapt to varying client needs and system conditions.

The tools routing engine 406 facilitates the integration, invocation, and management of tools, including both external tools, such as third-party APIs and actuators, and internal tools 422. It ensures seamless interactions between these tools and the AAII by handling API calls, response processing, and error management. The tools routing engine 406 retrieves task-specific instructions from the configuration/objectives database 438, ensuring that tools are invoked in accordance with client-defined requirements.

The tools routing engine 406 can manage tasks that impact virtual or physical environments, such as sending notifications, performing database updates, or triggering actuators. For example, it may invoke a third-party API to process a payment or call an internal tool 422 to update a proprietary database. Similar to the AI model routing engine 404, the tools routing engine 406 dynamically selects and invokes the appropriate tool based on task requirements and/or configuration rules. The agent routing engine 408 enables the system to coordinate with external AI agents, which are autonomous systems capable of decision-making or executing complex tasks. For example, the agent routing engine 408 may interact with a logistics agent to track shipments or a scheduling agent to manage workflows across multiple departments.

The context engine 410 retrieves and augments task-related context to enhance the accuracy and relevance of AI-generated responses. Managed by the orchestrating agent 402 or operating independently in specific scenarios, such as embedding, fine-tuning, or AI model training, the context engine 410 plays a central role in data and memory management. The context engine 410 may interact with one or more of the short-term memory 432, the long-term memory 434, and/or one resource base (e.g., the resource base 308) components of a customer infrastructure to provide relevant context for tasks.

For example, in a customer service scenario, the context engine 410 may enrich a query about a delayed shipment by retrieving the client's historical order records stored in the long-term memory 434. Similarly, in a chatbot scenario, if a user asks, "Where is my delivery?" after an initial "Hi," the context engine 410 may retrieve relevant data from historical records, augmenting the query before routing it to an external AI model. These capabilities enable the context engine 410 to deliver enriched input to AI models, ensuring precise and context-aware responses.

The security/compliance engine 412 ensures compliance with privacy regulations, safeguards sensitive client data, and enforces security and compliance policies. The security/compliance engine 412 achieves this by anonymizing inputs before transmitting them to external providers, filtering confidential information, and enforcing access control measures to restrict unauthorized access. To illustrate, when processing legal documents or contracts, the security/compliance engine 412 may replace specific company names, individual identifiers, or sensitive terms with generic placeholders before transmission to external AI models. These placeholders are then systematically replaced with the original values in the response, ensuring sensitive information remains protected while maintaining the coherence and utility of the AI-generated content. This approach is particularly critical in scenarios involving financial data, healthcare information, or proprietary business terms that demand strict confidentiality.

In some implementations, the security/compliance engine 412 may be deployed within the customer infrastructure, such as the customer infrastructure 304 shown in FIG. 3. By operating within the customer's environment, the security/compliance engine 412 can prevent sensitive data from ever leaving the customer's network. This approach offers several benefits, including enhanced data privacy, reduced exposure to third-party providers, and greater control over compliance with internal policies and external regulations. For example, a healthcare organization may deploy the security/compliance engine 412 on-premises to ensure that protected health information (PHI) is anonymized or processed entirely within its secure infrastructure.

As such, the architecture of the security/compliance engine 412 may support flexible deployment models to accommodate varying security requirements. Organizations can choose to deploy the security/compliance engine entirely within their infrastructure, creating a secure enclave where sensitive data processing occurs before any external transmission. This deployment option is particularly beneficial for organizations in regulated industries or those handling highly sensitive data, as it provides maximum control over data security and compliance. The security/compliance engine can operate as a gateway, ensuring that only appropriately processed and sanitized data reaches external AI providers or tools. Thus, a request to be transmitted to the AAII 400 may be routed via a locally deployed security/compliance engine; or a request may first be transmitted to a locally deployed instance of the security/compliance engine to obtain a compliant request, and then the compliant request may be transmitted to the AAII 400, thereby ensuring sensitive data is properly sanitized before leaving the organization's infrastructure.

The evaluation engine 414 monitors and evaluates the quality, performance, and reliability of external and internal AI models, tools, and agents used by or within the AAII 400. The evaluation engine 414 may collect telemetry data and response metrics from the logs 440, analyzing this information to assess the effectiveness of both internal and external resources. The evaluation engine 414 updates performance metrics in the AI models register 430, creating a continuous feedback loop that enables the system to refine its routing decisions over time. This ensures that the most reliable and high-performing resources are prioritized for handling client requests.

The evaluation engine 414 assesses various parameters, including response accuracy, latency, and failure rates, to generate a comprehensive performance profile for each resource. For instance, if an external AI model consistently exhibits high latency during peak hours, the evaluation engine 414 records this information and adjusts the routing logic to favor alternative AI models during those periods. Similarly, the evaluation engine 414 can detect degraded performance or anomalies in internal tools and recommend adjustments to optimize their usage.

The evaluation engine 414 can play a critical role in maintaining system efficiency. For example, when routing requests to external AI models for tasks like language generation, the evaluation engine 414 may assess the quality of the generated responses and provide feedback to improve future model selection. If a response from an external agent or tool fails to meet predefined thresholds, the evaluation engine 414 flags the issue for further analysis, ensuring consistent system reliability.

The scheduling engine 416 can be used to manage the timing, prioritization, and execution of tasks within the AAII. It enables asynchronous operations by queuing tasks for later execution, initiating autonomous internal tasks, and coordinating workflows that require multiple resources. The scheduling engine 416 can be used for maintaining task queues and adjusting execution timing based on system load, resource availability, and task priority.

While scheduling engine 416 may function as part of the orchestrating agent 402, it may also operate independently to handle specific scheduling requirements. For example, the scheduling engine 416 may schedule a series of data processing steps, such as data retrieval, analysis, and report generation, to be executed overnight. This approach minimizes resource costs during peak hours while ensuring timely completion of the tasks. To illustrate, the scheduling engine 416 can manage tasks that require repeated execution, such as scheduling a task to query an external tool or model every hour to monitor system performance or track updates.

As another example, a scheduled AI task might involve monitoring a document repository and triggering automated summarization whenever new documents are added. In this scenario, the scheduling engine 416 periodically checks the repository for new content, and when detected, it coordinates with the AI model routing engine 404 to select an appropriate summarization AI model, retrieves relevant context through the context engine 410, and schedules the summarization task during off-peak hours to optimize costs. In some implementations, the generated summaries can then be automatically embedded in the vector database 436 for future retrieval and context augmentation.

The memory manager 418 can be used to organize, retrieve, and coordinate stored data so that, for example, appropriate context is available for each task within the AAII 400. The memory manager 418 manages access to all memory systems, including short-term memory 432 for active session data and long-term memory 434 for historical records. The memory manager 418 may additionally manage access to vector databases for embeddings and semantic search. The memory manager 418 also implements caching strategies, using the cache to store temporary data for quick access during ongoing sessions, thereby optimizing performance and reducing latency.

To further optimize performance and reduce unnecessary model invocations, the AAII 400 may implement intelligent caching strategies for common queries. For example, in customer service scenarios, frequently asked simple questions like initial greetings can be served directly from the cache without invoking an AI model. This optimization significantly reduces latency and costs while maintaining response quality for routine interactions. The caching strategy is particularly effective for high-frequency, low-complexity queries that typically yield consistent responses.

The memory manager 418 ensures seamless integration between the various memory components to provide relevant context for tasks. To illustrate, in a customer service scenario, the memory manager 418 retrieves data from the short-term memory 432 to maintain conversational continuity during a chatbot interaction, while simultaneously accessing historical order records from the long-term memory 434 to augment the context of the response. The vector database 436 may be used to retrieve semantically relevant information, enriching the AI-generated output. The vector database 436 contains public and semi-public information used for model fine-tuning and knowledge augmentation, providing general domain knowledge to enhance AI model responses. In some implementations, the vector database 436 may only be used for fine-tuning. In such implementations, the vector database 436 is not used for dynamic data or user- or customer-specific data that other users or customers should know or use.

The AI models register 430 can be or maintain a repository of metadata for internal and external AI models available to the AAII 400. The AI models register 430 maintains detailed information about each model, including its capabilities, performance metrics, cost parameters, availability status, and APIs or endpoints for invoking the AI models. The orchestrating agent 402 and the AI model routing engine 404 rely on this AI register to select and interact with the most appropriate models for given tasks, ensuring seamless integration and optimal alignment with task requirements.

The metadata stored in the AI models register 430 may include parameters such as the model vendor, provider, pricing details (e.g., costs for prompts, completions, or requests), supported context length, performance characteristics (e.g., latency, accuracy), and features such as vision capabilities, streaming support, and tool integration. The register also tracks the APIs or endpoints required to invoke each model, along with associated authentication credentials, query structures, and response formats. This ensures that the system can dynamically connect to and utilize both internal and external models with minimal latency or configuration overhead. Additionally, AI models may be categorized by the AI models register 430 based on their capabilities, such as classification, searching, natural language generation, or data summarization, allowing the system to route requests to models specialized for specific tasks.

For example, when the AAII 400 receives a request requiring a search operation, the AI models register 430 provides the AI model routing engine 404 with metadata identifying models optimized for searching tasks, including the appropriate API endpoints and invocation parameters. Similarly, for natural language generation tasks, the AI models register 430 can be used to ensure that required configuration details, such as supported context length and response format, are available to enable efficient routing and interaction.

In addition to AI models, the AI models register 430 may also include details necessary for integration with external systems, such as rate limits, error-handling protocols, and usage quotas for APIs. Similar registers (not shown in FIG. 4A) may exist for tools, agents, or knowledge resources, providing analogous metadata and parameters for these components.

The short-term memory 432 stores temporary session data related to active interactions, such as recent client queries, conversation history, and intermediate processing states. This enables the system to maintain context within a session, ensuring smooth transitions and continuity in multi-turn conversations or ongoing operations. For example, in a chatbot scenario, the short-term memory 432 allows the system to remember the sequence of a user's queries, such as "Hi" followed by "Where is my package?" to provide a cohesive and context-aware response.

The long-term memory 434 retains persistent data, including client profiles, historical interactions, transaction histories, and cached responses. This data is used for personalization, compliance, and context augmentation in complex tasks. For instance, if a user frequently inquires about specific services, the long-term memory 434 can be used to ensure that this pattern is remembered, enabling the AAII 400 to tailor responses and streamline interactions based on past context (e.g., behavior, responses, or interactions).

The vector database 436 stores embeddings and vector representations optimized for retrieval-augmented generation (RAG). It supports semantic searches by enabling the context engine 410 to dynamically retrieve relevant information based on similarity metrics. Customer data may be duplicated into the system through an initial import and/or frequent updates, or summarized into embeddings for efficient storage and retrieval. For example, when a user requests a summary of a contract, the vector database 436 may provide embeddings that enhance the AI-generated summary by referencing related clauses or legal terms stored in the system. This approach ensures that the system has ready access to client-specific information while optimizing storage and search operations.

In some implementations, the vector database 436 may only be used to store embeddings and vector representations of public and semi-public information for model fine-tuning. In such implementations, the vector database 436 can be used to support AI model improvement by maintaining embeddings of publicly available domain knowledge.

The configuration/objectives database 438 contains AAII 400 settings, client-defined parameters, operational objectives, routing rules, and security policies. The configuration/objectives database 438 enables specifying preferences for AI model selection, fallback strategies, and performance thresholds. For instance, a rule may be defined to prioritize cost-efficient models for routine tasks while reserving high-performance models for critical operations. Such configurations can be used by the orchestrating agent 402 and other components to align system behavior with customer requirements.

The logs 440 store telemetry data, performance metrics, and detailed operational history for system monitoring and optimization. This includes records such as model performance, task execution history, and error logs. The evaluation engine 414 uses the logs 440 to refine routing decisions and identify areas for improvement, creating a feedback loop that enhances system efficiency and reliability.

The AAII 400 may include caching mechanisms for rapid access to frequently accessed data and session stores for maintaining stateful information about ongoing interactions. Caches reduce latency by storing data from clients, internal engines, or external components, enabling quick retrieval during high-frequency operations. Session stores maintain information about ongoing interactions across multiple related tasks, ensuring smooth transitions and preserving continuity in extended workflows.

The AAII 400 may provide (e.g., include or implement) various interfaces to facilitate interaction with clients and external systems. These interfaces may include a data API, which serves as an entry point for retrieving data from client systems and may be integrated with other components like the Embedding, Context, or Security/compliance engines. Additionally, the system provides a Management API/Web UI, allowing administrators to manage and configure the intermediary, access telemetry data, statistics, logs, and other metadata. A Client API/Web UI may act as the primary entry point for clients to access the services offered by the AAII. These interfaces collectively enable seamless communication and integration between the intermediary, clients, and external resources.

Figure 4B:
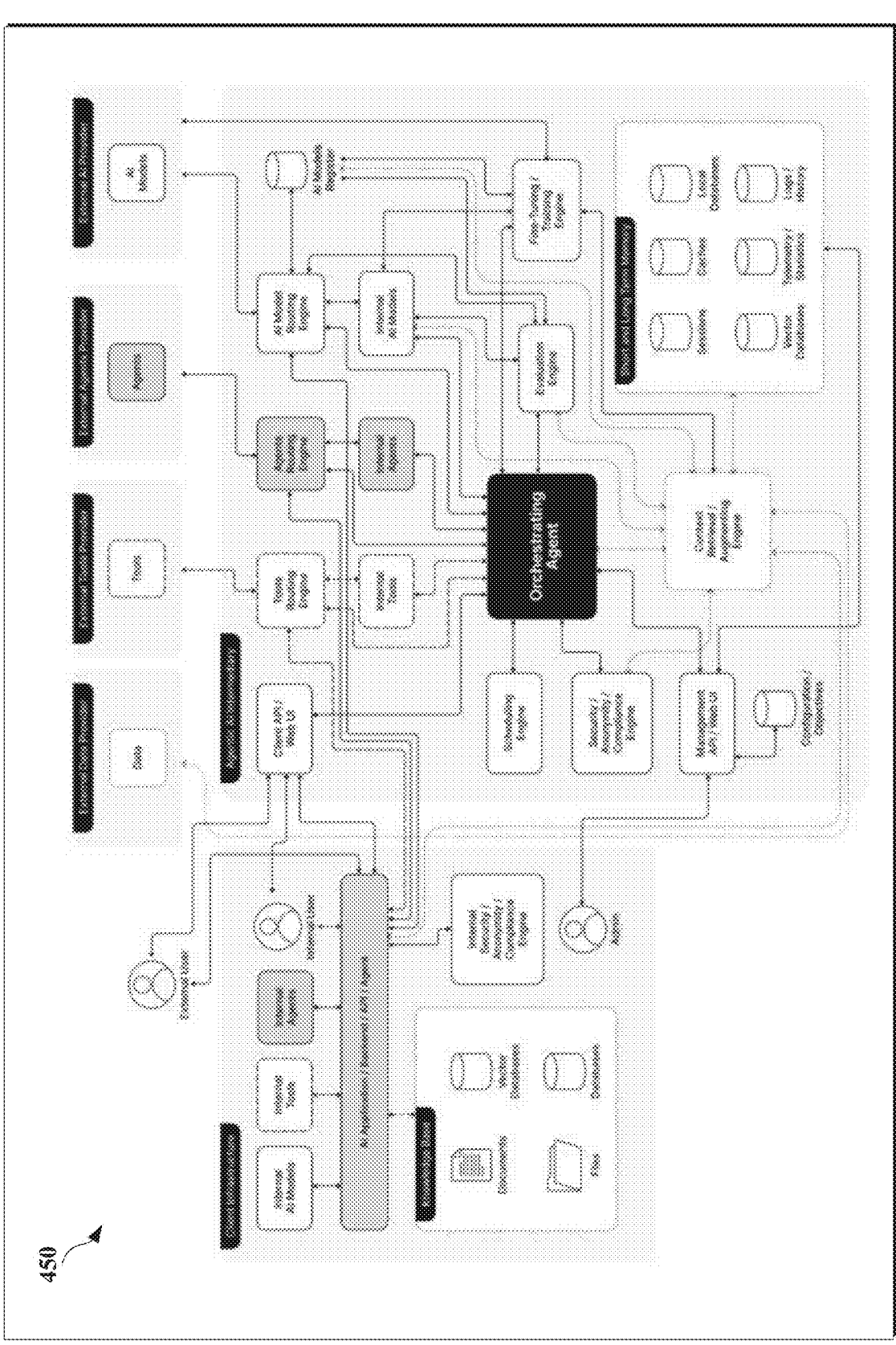
FIG. 4B illustrates a diagram of some of the interactions and data flows within the AAII of FIG. 4A.

FIG. 4B illustrates a diagram 450 of some of the interactions and data flows within the AAII 400. The diagram shows how the AAII 400 handles data/knowledge flows, tool functions, agent communications, internal system connections, and training processes. The diagram 450 highlights the role of the orchestrating agent 402 in coordinating interactions among routing engines, memory systems, and security/compliance mechanisms, while managing communications with external providers and the customer infrastructure. External users and administrators interact with the system via dedicated APIs, while internal data flows enable context enrichment, security enforcement, and the dynamic routing of requests across AI models, tools, and agents.

As detailed with respect to FIG. 4A, the AAII 400 integrates components such as routing engines, context retrieval engines, and training engines to manage interactions with internal client infrastructure, external providers, and agents. Data repositories, including short-term memory, long-term memory, and vector databases, facilitate context retrieval and aggregation. FIG. 4B further illustrates at least some of the communication pathways among components, including the orchestrating agent, management APIs, and external knowledge resources, showcasing how client-defined parameters, task objectives, and telemetry data ensure seamless integration and optimized operations across diverse systems. The specific functions and roles of the components are described in FIG. 4A.

While FIG. 4A and FIG. 4B illustrate the architecture of the Agentic AI Intermediary, there are minor variations in the terminology and logical groupings used to describe components, data stores, and engines. Some of these differences are detailed as follows to ensure clarity and facilitate understanding.

As shown in FIG. 4B, certain components are identified with consistent terminology, such as 'internal tools,' 'internal agents,' and 'internal AI models,' which appear in both the Agentic AI Intermediary and the Client Infrastructure sections of diagram 450. For clarity, the internal components illustrated within the Agentic AI Intermediary of FIG. 4B directly map to similar components described with respect to FIG. 4A, such as the internal AI models 420 and internal tools 422. Conversely, the internal components illustrated within the Client Infrastructure in FIG. 4B correspond to the components described with respect to FIG. 3, such as the internal AI models 317, internal tools 310, and internal agents 319 of the resource base 308.

As shown in FIG. 4B, the data stores for memory management within the Agentic AI Intermediary are represented under the logical grouping 'Short and Long Term Memory,' which corresponds to separate memories (e.g., the short-term memory 432 and the long-term memory 434) shown in FIG. 4A. This grouping in diagram 450 includes additional logical categories such as 'Sessions,' 'Caches,' and 'Local Databases,' which are not explicitly labeled as separate categories in FIG. 4A. The 'Vector Databases' label in FIG. 4B corresponds to the 'Vector DB' in FIG. 4A (the vector database 436), and 'Telemetry/Statistics/Logs/History' aligns with the logs 440 data store in FIG. 4A. These differences reflect varying logical groupings of data stores between the figures.

As shown in FIG. 4B, the engines within the Agentic AI Intermediary are represented with logical groupings that include 'AI Model Routing Engine,' 'Tools Routing Engine,' and 'Agent Routing Engine,' which correspond to the same engine names listed in FIG. 4A. FIG. 4B also introduces the 'Fine-Tuning/Training Engine,' which is not explicitly mentioned as a separate engine in FIG. 4A. Additionally, FIG. 4B uses 'Context Retrieval/Augmenting Engine' instead of the 'Context Engine' shown in FIG. 4A, and includes other engines such as 'Security Engine,'

'Evaluation Engine,' 'Scheduling Engine,' and 'Memory Manager,' which are listed in FIG. 4A. These differences reflect varying logical groupings or naming of engines between the figures.

Figure 5:
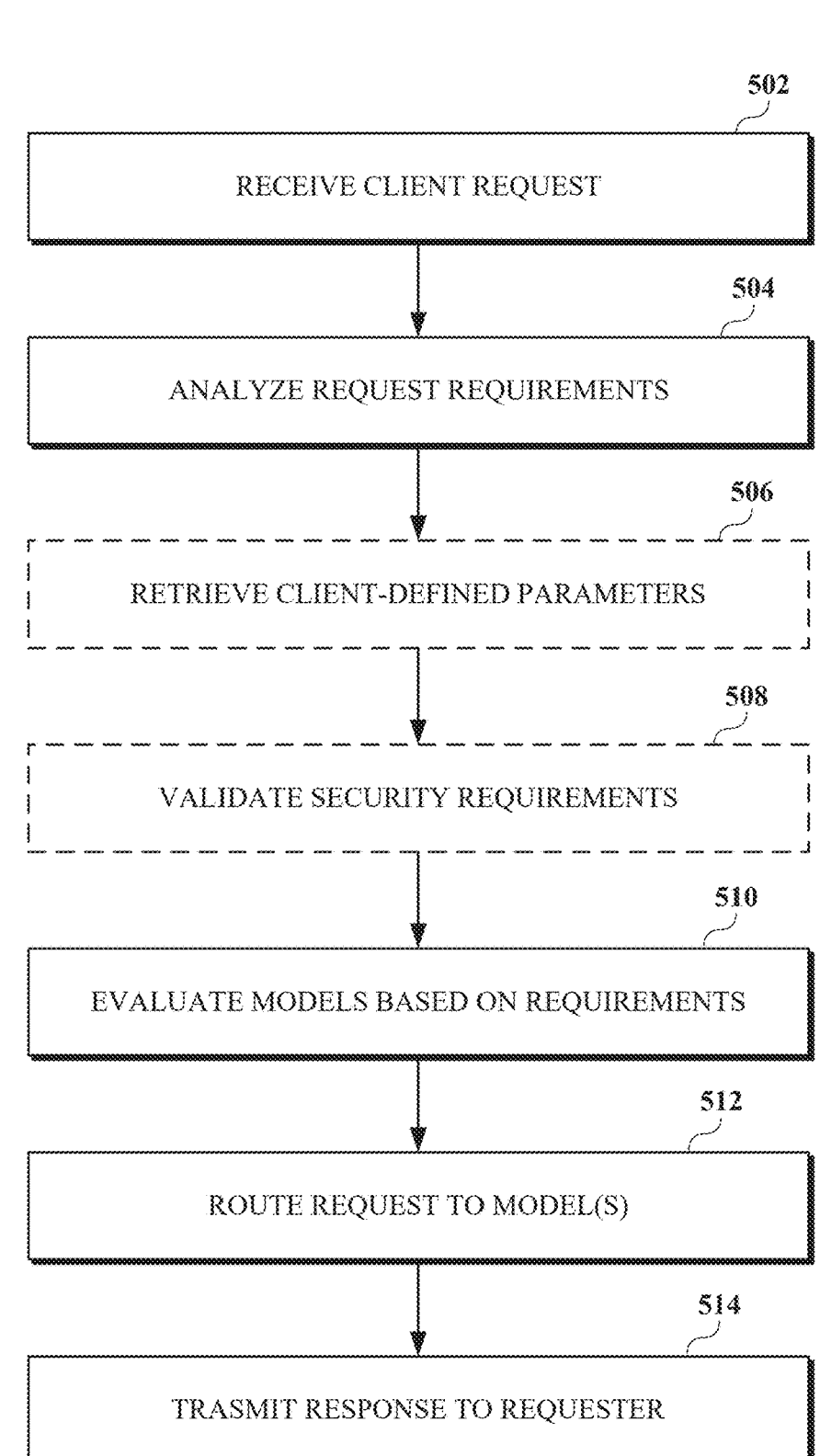
FIG. 5 is a flowchart of a technique for dynamically selecting and invoking an optimal AI model to process client requests.

FIG. 5 is a flowchart of a technique 500 for dynamically selecting and invoking an optimal AI model to process client requests based on task requirements, client-defined parameters, and system conditions. The technique 500 can be executed using computing devices, such as the systems, hardware, and software described with respect to FIGS. 1-4B. The technique 500 can be performed, for example, by executing a machine-readable program or other computer-executable instructions, such as routines, instructions, programs, or other code. The steps, or operations, of the technique 500, or another technique, method, process, or algorithm described in connection with the implementations disclosed herein, can be implemented directly in hardware, firmware, software executed by hardware, circuitry, or a combination thereof. The technique 500 can be implemented by an AAII.

At block 502, a client request is received. This request can be submitted through various interfaces, such as an API, web interface, or another client-facing system. The request may include specific instructions or general queries, such as a request to analyze sales data, generate a summary of a document, or classify images. The request is such that completing or fulfilling it requires transmitting at least some aspect of the request to an AI model. The request may be received by the orchestrating agent 402 of FIG. 4A.

At block 504, the request requirements are analyzed. This step involves understanding the request's intent, determining its complexity, and identifying its associated data dependencies. As part of this analysis, context may be retrieved using the context engine 410, which interacts with various memory systems and external sources to enrich the request. Context retrieval may involve accessing the short-term memory 432 to maintain session continuity, such as retrieving conversation history for a chatbot. Context retrieval may also involve long-term memory 434 to retrieve historical data, such as prior interactions or client profiles, or a vector database to retrieve semantically relevant embeddings for tasks like contract summarization or complex query augmentation. Context may be retrieved from the customer infrastructure, such as from sources within the resource base 308 of FIG. 3, including internal tools, vector databases, document repositories, or databases, to ensure task-specific data is dynamically incorporated. For example, a request to summarize a document might involve retrieving the document directly from the customer's knowledge base. Retrieving the context can be as described with respect to FIG. 6.

In an example, the orchestrating agent 402 may coordinate the analysis of the request. For instance, the orchestrating agent 402 may provide the request to one or more of the internal AI models 420 of FIG. 4A. These internal AI models may analyze the request to identify tasks required to fulfill it, generate a plan for executing the tasks, and/or determine the context data needed for the tasks. The orchestrating agent 402 can then use this information to route the request to the appropriate components, such as external AI models, tools, or agents, while ensuring that the tasks are executed in a logical and efficient sequence.

At block 506, client-defined parameters are retrieved from the configuration/objectives database 438. This step is optional and provides additional context or constraints for fulfilling the request. For example, a client might specify that cost-effective models should be prioritized for routine tasks, while high-performance models are reserved for critical operations. The retrieved parameters guide subsequent operations, ensuring alignment with client preferences.

At block 508, security requirements are validated, such as by the security/compliance engine 412. This optional step involves consulting the security/compliance engine 412 to ensure that the request complies with privacy regulations and organizational policies. For instance, if the request includes sensitive data, such as personal identifiers or confidential business information, the system may anonymize or filter the data before proceeding. This validation ensures that data is processed securely and in compliance with applicable regulations, such as General Data Protection Regulation (GDPR) or Health Insurance Portability and Accountability Act (HIPAA).

As already mentioned herein, the security/compliance engine 412 may be implemented within the customer infrastructure, such as customer infrastructure 304 of FIG. 3. In such cases, the received request may already be validated for security and compliance requirements before reaching the AAII. This pre-validation ensures that sensitive data is appropriately processed and that the request complies with applicable privacy regulations and organizational policies.

At block 510, AI models are evaluated based on the request requirements. The evaluation criteria include task performance, cost constraints, real-time availability, and client-defined preferences retrieved in block 506. The AI model routing engine 404 leverages the AI models register 430 to identify potential models that meet these criteria. For example, if the task involves generating a natural language response with a long context window, the system may select a model optimized for extended contexts. If no preferred model is available or fails to meet the required performance thresholds, fallback strategies may be applied to select an alternative model.

At block 512, the request is routed to the selected model(s). The technique 500 transmits the input data to the chosen AI model, whether it is an internal model or an external provider. This step is orchestrated by the orchestrating agent 402, which coordinates the invocation of the appropriate AI models, tools, or agents based on the plan generated during the earlier steps. Depending on the task, this process may involve invoking one or more API endpoints, handling authentication, and ensuring compatibility between the request format and the model's expected input structure.

The orchestrating agent may determine an optimal execution strategy for the tasks, with some tasks being performed in parallel to improve efficiency, while others are executed sequentially to maintain dependencies or ensure correct workflow order. For example, in a classification task, the system may route the input data to a lightweight internal model to minimize cost and latency. In a more complex task, such as generating a report based on multiple datasets, the orchestrating agent may first retrieve and analyze data through one AI model and then route the results to another model or external tool for further processing. The determination of the optimal execution strategy can be driven by a multi-factor analysis that evaluates various technical elements to create adaptive task orchestration.

The scheduling engine 416 may employ configurations ranging from internally preset rules for common task types to dynamically retrieved parameters from the configuration/ objectives database 438, which administrators can define via the Management API/UI. Client-supplied execution variables, tags, and rules received in real-time through the Client API/Web UI further refine this orchestration, allowing request-specific customization that can override static configurations. Context data may be used in this determination, with the memory manager 418 accessing both the short-term memory 432 for session-specific states and the long-term memory 434 for historical execution patterns, while the context engine 410 supplies semantic relationships and task metadata that help identify independent subtasks suitable for parallel processing.

The execution strategy of the orchestrating agent 402 may also be dynamically adapted based on intermediate results from internal tools 422, external tools 322, internal agents 319, external agents 324, or AI models, enabling non-deterministic workflows where sequencing evolves during execution. Operational constraints may be used in the determination process. For example, the orchestrating agent may assess resource availability from registries such as the AI models register 430 and considers temporary unavailability due to connectivity or capacity limitations reported by the evaluation engine 414.

At block 514, the response generated by the AI model(s) is transmitted back to the requester. A response can be delivered either as a complete output or as a continuous stream, depending on the nature of the request and the selected AI model's capabilities. For streaming responses, the system transmits data incrementally as it's generated, such as for real-time voice synthesis or continuous video processing. The response may include the processed results, such as a completed summary, classification label, or data analysis output. Before transmission, the system may perform post-processing, such as formatting the response, ensuring it complies with security policies, or validating its accuracy. For example, in a customer service application, the system might ensure that a chatbot response aligns with the organization's tone and style guidelines.

In some implementations, the technique 500 may include additional steps not depicted in FIG. 5. For example, after each request is processed, the technique 500 may log performance metrics and telemetry data in the logs 440, enabling the evaluation engine 414 to analyze this feedback and refine future routing decisions for continuous optimization. For example, if a selected model is unavailable or performs sub-optimally, the technique 500 may dynamically apply fallback strategies, such as selecting an alternative model or adjusting task parameters to ensure successful completion. Although the technique 500 presents a linear progression, certain steps may be handled concurrently in practice. For example, the security validation at block 508 and the retrieval of client-defined parameters at block 506 might occur in parallel to improve efficiency and reduce processing time.

FIG. 6 is a flowchart of a technique 600 for retrieving, processing, and integrating context data from multiple sources to support the fulfillment of AI model requests. The technique can be executed using computing devices, such as the systems, hardware, and software described with respect to FIGS. 1-4, and may be implemented by an AAII.

At block 602, a received request is analyzed to determine its context needs. This analysis may involve identifying the intent, complexity, and specific types of data required to enrich the request. Such data may include keywords, semantic relationships, relevant entities, prior interaction history, summaries of prior interactions, or any other information that an AI model can use to fulfill the request or a related task. Based on this analysis, the technique 600 extracts specific context requirements at block 604, which may involve identifying necessary background knowledge, relevant documents, historical data, or task dependencies.

At block 606, the technique 600 either loads an existing session, if one exists, or initializes a new session to manage context retrieval and maintain continuity across related tasks or multi-turn conversations. Session-specific data structures or variables may also be created to track the progress of the context retrieval process. Once the context requirements are identified, the technique 600 identifies relevant knowledge sources at block 608, which may include internal knowledge bases, external databases, domain-specific knowledge graphs, or embeddings.

At block 610, the technique 600 aggregates the required context by accessing one or more data sources, depending on the request's requirements. The sources accessed may include querying a vector database at block 610_2 to retrieve semantically relevant information, checking short-term memory at block 610_4 for recent or session-specific data, accessing long-term memory at block 610_6 to retrieve historical records or learned patterns, and checking an internal knowledge base at block 610_8 for organization-specific or proprietary knowledge. These operations may occur sequentially or in parallel, depending on the context requirements and system conditions.

Once the context is aggregated, at block 612, the technique 600 evaluates the context size and relevance. If the total amount of data in the context exceeds size limitations allowed, such as may be indicated in the AI models register 430 of FIG. 4A, by the model(s) to be used or includes irrelevant information, the technique 600 prunes less relevant context to ensure that only the most pertinent information is retained. At block 614, the remaining context is formatted for compatibility with the target AI model. This involves structuring the data, converting it into the required representation, or encoding it in a format suitable for processing. The enriched and formatted context is then integrated into the request-handling process to enable accurate and efficient task execution.

Figure 7:
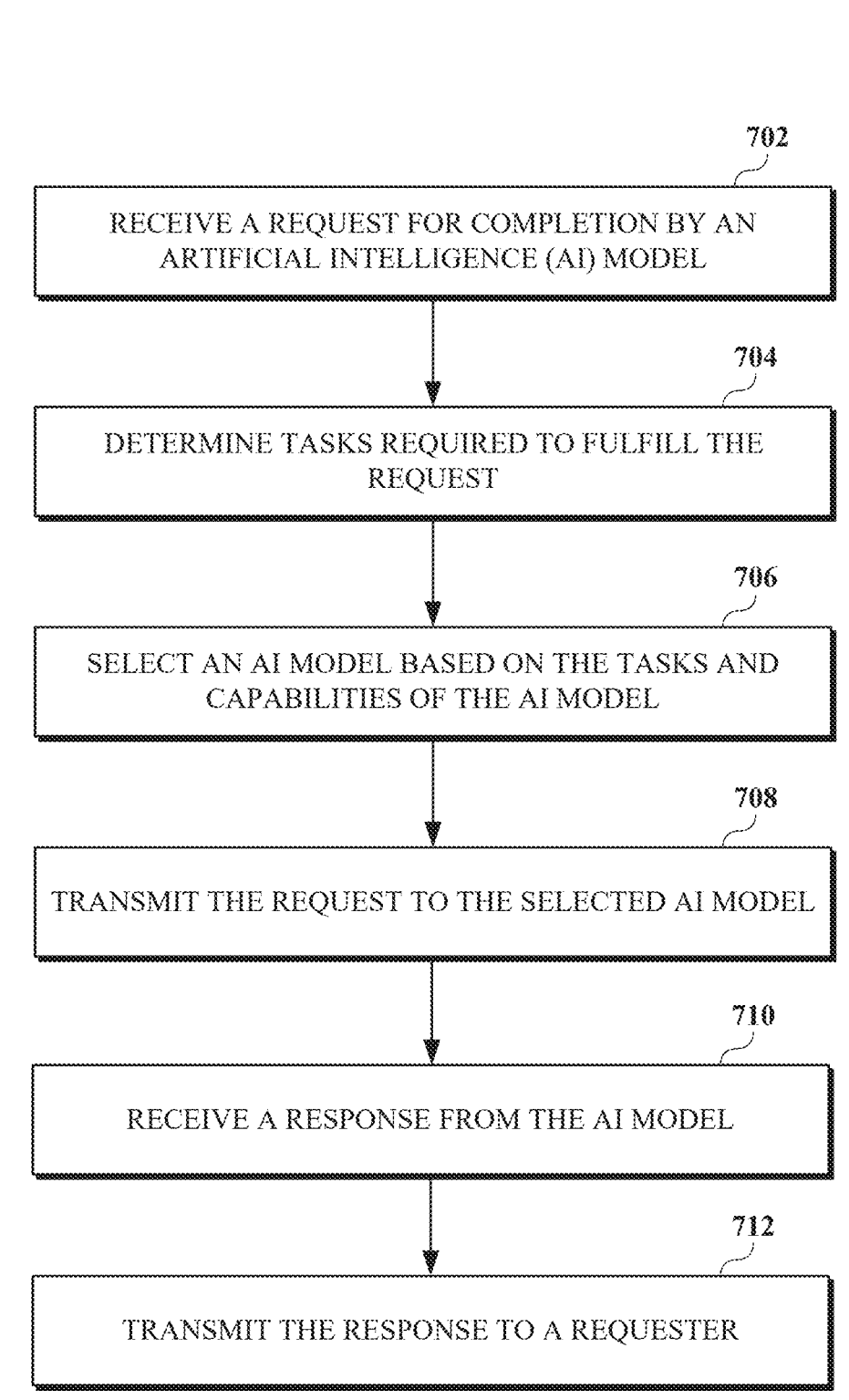
FIG. 7 is a flowchart of a technique for dynamically selecting and utilizing an AI model to process a request.

FIG. 7 is a flowchart of a technique 700 for dynamically selecting and utilizing an AI model to process a request. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein, can be implemented directly in hardware, firmware, software executed by hardware, circuitry, or a combination thereof. The technique 700 may be implemented by an AAII, such as the one described with respect to FIGS. 3-4, to dynamically analyze a request, select an appropriate AI model, and deliver a result to the requester.

At block 702, the technique 700 begins by receiving a request for completion by an AI model. The received request may originate from a client system, an API endpoint, or another external source. The request can specify a variety of tasks, such as natural language processing, data analysis, or decision-making. For example, the request may ask the system to summarize a document, classify an image, or retrieve insights from a dataset.

At block 704, the technique 700 identifies the tasks required to fulfill the request. This step involves analyzing the request to break it into one or more specific tasks. For instance, a request to analyze sales data and generate a summary may involve retrieving the relevant data, applying data analysis models, and creating a narrative summary. In some implementations, analyzing the request may include identifying context requirements, such as retrieving client preferences or session-related data.

In some implementations, identifying the tasks required to fulfill the request may involve a multi-faceted analysis that uses both the inherent structure of the request and the capabilities of the AAII. The orchestrating agent may employ natural language processing (NLP) techniques, heuristic rules, or machine learning models-such as those within the internal AI models 420—to parse the request and extract an intent, a scope, and dependencies. For example, the orchestrating agent may utilize one of the internal AI models to analyze the semantic structure of the request, identifying action verbs, target objects, contextual constraints, and desired outputs. This analysis may generate a structured representation of the request components, such as identifying that a request to "compare quarterly sales performance across regions and create an executive summary highlighting key trends" requires distinct tasks including data retrieval from multiple sources, temporal analysis, spatial comparison, trend identification, and natural language generation. The decomposition may involve mapping the request to predefined task templates stored in the configuration/objectives database 438 or dynamically generating a task sequence based on real-time analysis, ensuring adaptability to both structured and unstructured inputs.

The technique 700 may then construct a directed acyclic graph (DAG) of task dependencies and execution pathways based on the identified components. Each node in this graph represents a distinct task with its own resource requirements, context needs, and expected outputs, while edges represent the flow of data or dependencies between tasks. For instance, in a complex request involving both data analysis and content generation, the DAG may indicate that certain analysis tasks must complete before generation can begin, while other analysis tasks can be performed in parallel to optimize performance (e.g., execution speed). The technique 700 may also annotate each task node with metadata regarding its priority, estimated resource requirements, fallback strategies, and compatibility with various AI models, tools, or agents available in the AAII.

Implementation of identifying the tasks can vary depending on the complexity of the request and the resources available within the AAII. For instance, in a scenario involving a continuous data stream, such as real-time audio from a customer call, the technique 700 may employ a streaming parser to segment the input into discrete units, each corresponding to a distinct task (e.g., speech-to-text conversion, sentiment analysis, and response formulation). The technique 700 may use a context engine (e.g., the context engine 410) to assess whether additional context, such as prior interactions stored in a short-term memory (e.g., the short-term memory 432) or organizational policies from a long-term memory (e.g., the long-term memory 434), is required to refine the task list. Task determination may also involve prioritizing tasks based on client-defined parameters (e.g., urgency or cost constraints) retrieved from the configuration/objectives database 438, ensuring that the sequence of operations aligns with operational objectives like minimizing latency or maximizing accuracy.

Beyond initial prioritization, the orchestrating agent 402 may dynamically adjust the execution order of tasks during request processing, adapting to intermediate results and evolving system conditions. This adaptability stems from a continuous evaluation of variables such as task outputs, resource availability, and performance metrics, enabling the system to, essentially, rethink and reconfigure its execution plan mid-process to optimize outcomes or address unexpected scenarios.

The orchestrating agent 402 may dynamically adjust the task execution plan by monitoring intermediate results from internal tools 422, external tools 322, internal agents 319, external agents 324, or AI models, using these outputs to reassess the task dependency graph, such as a directed acyclic graph (DAG), constructed during initial task decomposition. For instance, if a task like data classification yields an unexpected result (e.g., an anomaly requiring further analysis), the orchestrating agent 402 may invoke the context engine 410 to retrieve additional context data from the short-term memory 432 or long-term memory 434, prompting a redefinition of subsequent tasks. This could involve skipping planned tasks deemed irrelevant, adding new tasks not originally anticipated, or altering the priority of remaining tasks to expedite critical operations, all coordinated through real-time updates to the DAG's structure and execution flow.

Furthermore, changing conditions such as model unavailability or performance degradation, as reported by the evaluation engine 414, may trigger the orchestrating agent 402 to re-sequence subtasks. If an AI model from the AI models register 430 becomes temporarily unavailable due to connectivity issues or exceeds latency thresholds, the AI model routing engine 404 may substitute an alternative model, prompting the orchestrating agent to adjust downstream task dependencies accordingly. This adjustment may shift the execution flow to a completely different branch, such as rerouting from a high-cost, high-performance model to a lightweight internal model, recalibrating resource allocation to maintain cost constraints. The orchestrating agent 402 may employ internal AI models 420 to analyze intermediate results and system telemetry from the logs 440, enabling predictive re-sequencing without relying solely on external prompts, though it may query an AI model for complex re-planning if the task complexity exceeds predefined thresholds stored in the configuration/objectives database 438.

Upon constructing a task graph, the technique 700 may perform a feasibility analysis to determine whether all required tasks can be fulfilled with the available resources and capabilities. This involves consulting the AI models register 430 to identify models capable of performing each task, evaluating the availability of necessary context data in the short-term memory 432, long-term memory 434, or other memory systems, and estimating the computational and time resources required for task completion. If gaps are identified, such as tasks requiring capabilities not available in the registered models or context data that cannot be retrieved, the technique 700 may implement contingency strategies, such as decomposing tasks into simpler subtasks, substituting with alternative approaches, or prompting the requester for additional information to enable task fulfillment.

To illustrate further, consider a complex request such as "Generate a quarterly sales report with forecasts and email it to the sales team." The task determination process breaks this into a series of interdependent subtasks: (1) querying a sales database, such as database 316, for historical data; (2) invoking an AI model specialized in data analysis, via the AI model routing engine 404, to compute trends and forecasts; (3) formatting the results into a narrative report using a language generation model; and (4) triggering an external tool, such as external tools 322, to send the email. The technique 700 may use a dependency graph or a workflow engine within the orchestrating agent to establish execution order-ensuring data retrieval precedes analysis—and may parallelize independent tasks, such as formatting and email preparation, to optimize efficiency. This step may also incorporate feedback from the evaluation engine 414 to refine task definitions based on historical performance, such as adjusting the scope of analysis if prior models struggled with certain data volumes, thereby enhancing the ability to handle diverse and evolving requests effectively.

At block 706, the technique 700 selects an AI model based on the tasks and capabilities of the AI model. The selection process may include retrieving client-defined parameters from a configuration database and identifying eligible AI models from an AI models register. The technique 700 evaluates the eligible AI models based on criteria such as real-time availability, performance metrics, and/or cost constraints. For example, if the task requires high accuracy and a long context window, the technique 700 may select a high-performance external model. If the request involves a lightweight classification task, an internal AI model optimized for low cost and latency may be selected.

Retrieving client-defined parameters from a configuration database may include accessing the configuration/objectives database 438, a centralized repository for operational preferences and constraints tailored to the client's needs. These parameters may be hierarchically structured, encompassing global preferences applicable to all requests, domain-specific parameters for particular task types, and request-specific overrides defined at runtime. The parameters may include quantitative thresholds, such as maximum acceptable latency (e.g., 500 milliseconds), cost limits per request (e.g., $0.01 per million tokens), or minimum accuracy requirements (e.g., 95% on a benchmark like MMLU), and qualitative directives, such as prioritizing models with specific capabilities (e.g., vision processing or tool integration) or restricting selection to providers compliant with regional data privacy regulations (e.g., GDPR). The technique 700 may query the database via an API call, retrieving a structured parameter set, potentially encoded in JSON, which the system parses to filter the initial pool of AI models. The retrieval may employ rule-based lookup that resolves parameter inheritance and precedence according to client-defined logic stored in the database. For example, in a customer service chatbot scenario, a client might specify low-cost models for off-peak hours and high-performance models for peak demand, enabling the technique 700 to dynamically adjust its selection strategy based on temporal or contextual factors.

Using the client-defined parameters, the technique 700 identifies a set of eligible AI models by consulting an AI models register (e.g., the AI models register 430). As described herein, the AI models register includes entries for each model, detailing technical specifications-such as supported context window size (e.g., 128,000 tokens), processing speed (e.g., tokens per second), and API endpoints—as well as performance metrics derived from historical usage (e.g., average latency, error rates) and compatibility with task types (e.g., classification, generation, reasoning). The technique 700 may apply a filtering algorithm that cross-references the task requirements identified at block 704—such as data analysis or natural language generation—with the client-defined parameters and model metadata.

The identification process may implement a multi-stage filtering approach: an initial filter eliminates models lacking mandatory capabilities (e.g., models without code generation for programming tasks), followed by a scoring phase that ranks remaining candidates based on alignment with client-specified criteria. The filtering may leverage a capability ontology, mapping high-level task requirements to specific model capabilities for semantic matching beyond simple keyword comparison. To illustrate, a request requiring a long context window and code generation might exclude lightweight models while shortlisting external models optimized for programming, such as those excelling in benchmarks like HumanEval. The technique 700 may also dynamically update the eligible set with real-time status checks, querying provider APIs to confirm model availability or load conditions, and periodically synchronize with external provider APIs to ensure metadata accuracy for newly released model versions or features.

The technique 700 may evaluate the eligible AI models using a multi-criteria decision-making process, orchestrated by the AI model routing engine 404, to balance real-time availability, performance metrics, and cost constraints in selecting an optimal model. This evaluation may employ a weighted scoring algorithm that assesses static metadata from the AI models register 430 and dynamic operational metrics. Real-time availability is monitored via factors such as server uptime, request queues, or rate limits, retrieved through API calls to external providers or telemetry from the logs 440, with health probes or status checks cached for a configurable time window to balance responsiveness and API overhead. Performance metrics—such as accuracy, latency, and robustness—are weighted against client priorities; for example, a task requiring high factual accuracy might prioritize a model with a strong MMLU score despite higher latency, while a real-time application might favor a faster model with lower accuracy.

The technique 700 incorporates real-time quality assessments from the evaluation engine 414, using a moving average to detect performance trends. Cost constraints are evaluated by incorporating dynamic pricing, usage quotas, and budget allocations, with just-in-time optimization factoring in time-of-day variations, bulk discounts, or tier thresholds. This cost-aware evaluation optimizes resource use within budgetary limits—for instance, selecting a higher-cost model for high-priority tasks and cost-effective options for routine requests. The optimal model is selected via a configurable weighting function, optionally enhanced by machine learning to adapt weights based on observed outcomes and feedback, improving selections over time. The decision and rationale are logged in the logs 440, fostering a continuous feedback loop that refines the selection process.

At block 708, the technique 700 transmits the request to the selected AI model. This step may involve invoking an API endpoint or another communication interface provided by the AI model. The technique 700 formats the request according to the model's input requirements, which may include preprocessing the request or augmenting it with context data. For example, if the request involves a chatbot scenario, the technique 700 may include prior conversation history retrieved from a short-term memory store.

At block 710, the technique 700 receives a response from the AI model. The response may include processed data, insights, or results generated by the AI model. For instance, in a document summarization request, the response may include a textual summary generated by the AI model. In some implementations, the technique 700 may monitor the performance metrics of the selected AI model while processing the request to update the AI models register and inform future selection processes (e.g., future AI model selection).

At block 712, the technique 700 transmits the response to the requester. The response may be sent back through the same channel from which the request was received or another specified endpoint. The response is delivered in a format suitable for the requester's application. For example, the result may be formatted in a structured way (such as a JavaScript Object Notation (JSON) object) for an API client or as a human-readable text for a user-facing application.

In some implementations, selecting the AI model includes filtering a set of AI models based on compatibility with the tasks to exclude AI models lacking required capabilities and ranking the filtered AI models using a scoring function that weights task-specific performance criteria. The technique 700 (e.g., via the AI model routing engine 404) may execute a multi-stage process, beginning with capability-based filtering that applies a constraint satisfaction algorithm to the AI models register. As mentioned, the AI models register may contain a capability matrix mapping each model to supported features—such as natural language generation, code interpretation, or visual analysis—and specifications like context window size (e.g., 128,000 tokens). To illustrate, a task requiring document summarization excludes models without text processing or sufficient context capacity. The remaining models may be ranked using a weighted scoring function, aggregating parameters like inference speed for real-time tasks, accuracy (e.g., HumanEval scores for coding), or token efficiency for cost-sensitive operations. Weights can be dynamically adjusted based on task priorities from client-defined parameters in the configuration/objectives database 438 or historical performance data from the logs 440, producing an ordered list where the highest-scoring model is selected, ensuring optimal alignment with the request's needs.

In some implementations, the technique 700 may include validating security requirements of the request using a security engine before transmitting the request to the selected AI model and anonymizing sensitive data in the request if the selected AI model is an external model. Via the security/compliance engine 412, the technique 700 may analyze the request against predefined policies in the configuration/objectives database 438, using pattern recognition, named entity recognition, or semantic analysis to detect sensitive elements like personally identifiable information (PII) or regulated data (e.g., HIPAA-protected health information). For example, in a healthcare scenario, the technique 700 may identify patient names or clinical terms requiring protection. If the selected model is an external model (e.g., from external AI models 320), the technique 700 anonymizes data by replacing identifiers with pseudonyms (e.g., "Patient_X"), redacting confidential content, or applying differential privacy techniques, tracked via a secure mapping table within the AAII.

In some implementations, transmitting the request to the selected AI model includes formatting the request into a data structure compatible with an API endpoint of the selected AI model and transmitting the formatted request via a secure communication channel. The technique 700 may construct a JSON or protocol buffer payload, adapting the request to the model's API specification from the AI models register 430, including headers and fields like "prompt" or "max_tokens" (e.g., chunking a large request to fit a 1024-token limit). Binary data, such as images, may be encoded (e.g., using base64). The formatted request may be transmitted over a secure channel using Transport Layer Security (TLS). For external models (e.g., external AI models 320), mutual TLS authentication verifies identities via digital certificates, supplemented by rate limiting and token-based authentication to prevent unauthorized access, ensuring secure and reliable data exchange as coordinated with the security/compliance engine 412.

In some implementations, the technique 700 may include decomposing the request into a plurality of subtasks if the request exceeds a complexity threshold and selecting a distinct AI model for at least one subtask based on specialized capabilities of the distinct AI model. Via the orchestrating agent 402, the technique 700 may evaluate complexity using metrics like the number of operations (e.g., retrieval, analysis, generation), estimated computational resources, or context breadth, compared against thresholds in the configuration/objectives database 438 (e.g., over three tasks). To illustrate, a request such as "analyze financial data, identify trends, and generate a visualized report" may be segmented into subtasks—data retrieval, trend analysis, and report creation-using dependency analysis or workflow partitioning. Via the AI model routing engine 404, the technique 700 may then select distinct models from the AI models register 430, routing numerical analysis to a model optimized for mathematical reasoning and report generation to one with strong natural language capabilities. Via the orchestrating agent 402, the technique 700 manages dependencies and aggregates results, leveraging specialized strengths to efficiently process complex requests.

FIG. 8 is a flowchart of a technique 800 for dynamically retrieving, formatting, and integrating context data from multiple sources to enhance the processing of client requests by an artificial intelligence (AI) model. The technique 800 can be executed using computing devices, such as the systems, hardware, and software described with respect to FIGS. 1-6. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein, can be implemented directly in hardware, firmware, software executed by hardware, circuitry, or a combination thereof. The technique 800 may be implemented by an AAII, such as the one described with respect to FIG. 3 and FIG. 4A, to dynamically analyze a request, aggregate context data, and deliver an enriched response to the requester.

At block 802, the technique 800 receives a client request. The request specifies a task to be completed by the system, such as generating a summary, performing a classification, or answering a query. The request may include parameters defining the task scope or requirements, such as accuracy thresholds or cost constraints.

At block 804, the client request is analyzed to determine the context requirements necessary to fulfill the task. This step involves identifying the intent and complexity of the request and extracting specific requirements such as keywords, entities, semantic relationships, or dependencies between the request and prior interactions stored in memory. For example, in a legal document summarization task, the system may identify that contextual information about key clauses and related legal terms is required to fulfill the request.

At block 806, the technique 800 identifies multiple data sources for context retrieval. These data sources may include at least one of a vector database, a short-term memory store for active session data, a long-term memory store for historical records, or an internal knowledge base containing proprietary client information. For instance, the technique

800 may identify a vector database to retrieve semantic embeddings and a knowledge base for specific contractual terms.

At block 808, the context data is obtained from (e.g., based on) the identified data sources. This step includes retrieving, aggregating, and refining context data from the selected sources. In some implementations, this may include pruning, to obtain remaining context data, and less relevant context data if the total amount exceeds a size limitation imposed by the target AI model. For example, the technique 800 may aggregate embeddings from the vector database, session-specific details from short-term memory, and historical records from long-term memory while discarding less relevant information to ensure optimized input for the AI model.

At block 810, the aggregated context data is formatted for compatibility with the target AI model. This step involves converting the context data into a format required by the model and embedding metadata to preserve task-specific parameters, such as user preferences or security constraints. For example, the system may structure the data as a JSON object with metadata tags indicating priority fields or processing instructions.

At block 812, the client request and the formatted context data are routed to the target AI model. This may involve invoking an API endpoint or another communication mechanism specific to the selected AI model. The system ensures compatibility between the input format of the request and the AI model's requirements. For instance, the system may append enriched context data to a natural language generation task to improve accuracy and relevance in the AI model's output.

At block 814, a response is received from the target AI model. The response is enhanced by the integrated context data, allowing the system to provide an accurate and contextually relevant output. For instance, in a chatbot scenario, the response may include detailed answers enriched with client-specific knowledge retrieved during the context aggregation step. Once the response is received, the system transmits the response to the requester in the desired format, completing the request processing workflow.

Some implementations are described below as numbered examples (Example A, B, C, etc.). These examples are provided as examples only and do not limit the other implementations disclosed herein.

Example A is a method that includes receiving a request for completion by an artificial intelligence (AI) model; identifying tasks required to fulfill the request; selecting an AI model based on the tasks and capabilities of the AI model; transmitting the request to the selected AI model; receiving a response from the AI model; and transmitting the response to a requester.

Example B is the method of Example A where selecting the AI model includes: retrieving client-defined parameters from a configuration database; identifying a set of eligible AI models from an AI models register based on the client-defined parameters; evaluating the eligible AI models based on real-time availability and performance metrics; and selecting an optimal AI model from the eligible AI models based on the evaluation.

Example C is the method of Example A further including: analyzing context requirements for the request; retrieving context data from multiple data sources including at least two of: a short-term memory store, a long-term memory store, or an internal knowledge base; aggregating the context data; pruning less relevant context data if a total amount exceeds a size limitation of the selected AI model to obtain remaining context data; and formatting the remaining context data for the selected AI model before transmitting the request.

Example D is the method of Example A further including: monitoring performance metrics of the selected AI model in fulfilling the request; updating an AI models register with the performance metrics; determining if the performance metrics meet predefined thresholds; and adjusting future AI model selection based on the performance metrics.

Example E is the method of Example A where selecting the AI model includes: filtering a set of AI models based on compatibility with the tasks to exclude AI models lacking required capabilities; and ranking the filtered AI models using a scoring function that weights task-specific performance criteria.

Example F is the method of Example A further including: validating security requirements of the request using a security engine before transmitting the request to the selected AI model; and anonymizing sensitive data in the request if the selected AI model is an external model.

Example G is the method of Example A where transmitting the request to the selected AI model includes: formatting the request into a data structure compatible with an API endpoint of the selected AI model; and transmitting the formatted request via a secure communication channel.

Example H is the method of Example A further including: decomposing the request into a plurality of subtasks if the request exceeds a complexity threshold; and selecting a distinct AI model for at least one subtask based on specialized capabilities of the distinct AI model.

Example I is a system that includes a memory subsystem and processing circuitry. The processing circuitry is configured to execute instructions stored in the memory subsystem to receive a request for completion by an artificial intelligence (AI) model; identify tasks required to fulfill the request; select an AI model based on the tasks and capabilities of the AI model; transmit the request to the selected AI model; receive a response from the AI model; and transmit the response to a requester.

Example J is the system of Example I where to select the AI model includes to: retrieve client-defined parameters from a configuration database; identify a set of eligible AI models from an AI models register based on the client-defined parameters; evaluate the eligible AI models based on real-time availability and performance metrics; and select an optimal AI model from the eligible AI models based on the evaluation.

Example K is the system of Example I where the processing circuitry further configured to execute instructions stored in the memory subsystem to: analyze context requirements for the request; retrieve context data from multiple data sources including at least two of: a short-term memory store, a long-term memory store, or an internal knowledge base; aggregate the context data; prune less relevant context data if a total amount exceeds a size limitation of the selected AI model to obtain remaining context data; and format the remaining context data for the selected AI model before transmitting the request.

Example L is the system of Example I where the processing circuitry further configured to execute instructions stored in the memory subsystem to: monitor performance metrics of the selected AI model in fulfilling the request; update an AI models register with the performance metrics; determine if the performance metrics meet predefined thresholds; and adjust future AI model selection based on the performance metrics.

Example M is the system of Example I where to select the AI model includes to: filter a set of AI models based on compatibility with the tasks to exclude AI models lacking required capabilities; and rank the filtered AI models using a scoring function that weights task-specific performance criteria.

Example N is the system of Example I where the processing circuitry further configured to execute instructions stored in the memory subsystem to: validate security requirements of the request using a security engine before transmitting the request to the selected AI model; and anonymize sensitive data in the request if the selected AI model is an external model.

Example O is the system of Example I where to transmit the request to the selected AI model includes to: format the request into a data structure compatible with an API endpoint of the selected AI model; and transmit the formatted request via a secure communication channel.

Example P is one or more non-transitory computer readable media storing instructions operable to cause one or more processors to perform operations including: receiving a request for completion by an artificial intelligence (AI) model; identifying tasks required to fulfill the request; selecting an AI model based on the tasks and capabilities of the AI model; transmitting the request to the selected AI model; receiving a response from the AI model; and transmitting the response to a requester.

Example Q is the one or more non-transitory computer readable media of Example P where selecting the AI model includes: retrieving client-defined parameters from a configuration database; identifying a set of eligible AI models from an AI models register based on the client-defined parameters; evaluating the eligible AI models based on real-time availability and performance metrics; and selecting an optimal AI model from the eligible AI models based on the evaluation.

Example R is the one or more non-transitory computer readable media of Example P where the operations further include: analyzing context requirements for the request; retrieving context data from multiple data sources including at least two of: a short-term memory store, a long-term memory store, or an internal knowledge base; aggregating the context data; pruning less relevant context data if a total amount exceeds a size limitation of the selected AI model to obtain remaining context data; and formatting the remaining context data for the selected AI model before transmitting the request.

Example S is the one or more non-transitory computer readable media of Example P where the operations further include: monitoring performance metrics of the selected AI model in fulfilling the request; updating an AI models register with the performance metrics; determining if the performance metrics meet predefined thresholds; and adjusting future AI model selection based on the performance metrics.

Example T is the one or more non-transitory computer readable media of Example P where the operations further include, where selecting the AI model includes: filtering a set of AI models based on compatibility with the tasks to exclude AI models lacking required capabilities; and ranking the filtered AI models using a scoring function that weights task-specific performance criteria.

Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving a request for completion by an artificial intelligence (AI) model;
identifying tasks required to fulfill the request;
selecting an AI model from available AI models based on the tasks and capabilities of the available AI models, wherein the selected AI model is a large language model;
retrieving context data relevant to the request;
querying an AI models register that stores technical specifications for a plurality of AI models to retrieve a maximum token limit associated with the selected AI model, wherein different AI models in the AI models register have different maximum token limits;
determining a total number of tokens for the context data;
pruning less relevant context data from the context data if the determined total number of tokens for the context data exceeds the retrieved maximum token limit,
wherein the less relevant context data are identified based on relevance to the request based on contextual importance or historical usage, and
wherein tokens comprise discrete textual units for processing by the selected AI model;
formatting the request and the context data into a data structure compatible with an API endpoint of the selected AI model;
transmitting the formatted request and the formatted context data to the selected AI model;
receiving a response from the AI model; and
transmitting the response to a requester.

2. The method of claim 1, wherein selecting the AI model comprises:
retrieving client-defined parameters from a configuration database;
identifying eligible AI models from an AI models register based on the client-defined parameters;
evaluating the eligible AI models based on real-time availability and performance metrics; and
selecting an optimal AI model from the eligible AI models based on the evaluation.

3. The method of claim 1, wherein retrieving the context data relevant to the request comprises:
analyzing context requirements for the request;
retrieving the context data from multiple data sources comprising at least two of: a short-term memory store, a long-term memory store, or an internal knowledge base;
aggregating the context data; and
formatting the context data for the selected AI model before transmitting the request.

4. The method of claim 1, further comprising:
monitoring performance metrics of the selected AI model in fulfilling the request;
updating an AI models register with the performance metrics;
determining if the performance metrics meet predefined thresholds; and
adjusting future AI model selection based on the performance metrics.

5. The method of claim 1, wherein selecting the AI model comprises:
filtering a set of AI models based on compatibility with the tasks to exclude AI models lacking required capabilities; and
ranking the filtered AI models using a scoring function that weights task-specific performance criteria.

6. The method of claim 1, further comprising:
validating security requirements of the request using a security engine before transmitting the request to the selected AI model; and
anonymizing sensitive data in the request if the selected AI model is an external model.

7. The method of claim 1, wherein transmitting the request to the selected AI model comprises:
formatting the request into a data structure compatible with an API endpoint of the selected AI model; and
transmitting the formatted request via a secure communication channel.

8. The method of claim 1, further comprising:
decomposing the request into a plurality of subtasks if the request exceeds a complexity threshold; and
selecting a distinct AI model for at least one subtask based on specialized capabilities of the distinct AI model.

9. A system comprising:
a memory subsystem; and
processing circuitry, the processing circuitry configured to execute instructions stored in the memory subsystem to:
receive a request for completion by an artificial intelligence (AI) model;
identify tasks required to fulfill the request;
select an AI model from available AI models based on the tasks and capabilities of the available AI models, wherein the selected AI model is a large language model;
retrieve context data relevant to the request;
query an AI models register that stores technical specifications for a plurality of AI models to retrieve a maximum token limit associated with the selected AI model, wherein different AI models in the AI models register have different maximum token limits;
determine a total number of tokens for the context data;
prune less relevant context data from the context data if the determined total number of tokens for the context data exceeds the retrieved maximum token limit,
wherein the less relevant context data are identified based on relevance to the request based on contextual importance or historical usage, and
wherein tokens comprise discrete textual units for processing by the selected AI model;
format the request and the context data into a data structure compatible with an API endpoint of the selected AI model;
transmit the formatted request and the formatted context data to the selected AI model;
receive a response from the AI model; and
transmit the response to a requester.

10. The system of claim 9, wherein to select the AI model comprises to:

retrieve client-defined parameters from a configuration database;

identify eligible AI models from an AI models register based on the client-defined parameters;

evaluate the eligible AI models based on real-time availability and performance metrics; and select an optimal AI model from the eligible AI models based on the evaluation.

11. The system of claim 9, wherein to retrieve the context data relevant to the request comprises:

analyze context requirements for the request;

retrieve the context data from multiple data sources comprising at least two of: a short-term memory store, a long-term memory store, or an internal knowledge base;

aggregate the context data; and format the context data for the selected AI model before transmitting the request.

12. The system of claim 9, wherein the processing circuitry further configured to execute instructions stored in the memory subsystem to:

monitor performance metrics of the selected AI model in fulfilling the request;

update an AI models register with the performance metrics;

determine if the performance metrics meet predefined thresholds; and adjust future AI model selection based on the performance metrics.

13. The system of claim 9, wherein to select the AI model comprises to:

filter a set of AI models based on compatibility with the tasks to exclude AI models lacking required capabilities; and rank the filtered AI models using a scoring function that weights task-specific performance criteria.

14. The system of claim 9, wherein the processing circuitry further configured to execute instructions stored in the memory subsystem to:

validate security requirements of the request using a security engine before transmitting the request to the selected AI model; and anonymize sensitive data in the request if the selected AI model is an external model.

15. The system of claim 9, wherein to transmit the request to the selected AI model comprises to:

format the request into a data structure compatible with an API endpoint of the selected AI model; and transmit the formatted request via a secure communication channel.

16. One or more non-transitory computer readable media storing instructions operable to cause one or more processors to perform operations comprising:

receiving a request for completion by an artificial intelligence (AI) model;

identifying tasks required to fulfill the request;

selecting an AI model from available AI models based on the tasks and capabilities of the available AI models, wherein the selected AI model is a large language model;

retrieving context data relevant to the request;

querying an AI models register that stores technical specifications for a plurality of AI models to retrieve a maximum token limit associated with the selected AI model, wherein different AI models in the AI models register have different maximum token limits;

determining a total number of tokens for the context data;

pruning less relevant context data from the context data if the determined total number of tokens for the context data exceeds the retrieved maximum token limit, wherein the less relevant context data are identified based on relevance to the request based on contextual importance or historical usage, and wherein tokens comprise discrete textual units for processing by the selected AI model;

formatting the request and the context data into a data structure compatible with an API endpoint of the selected AI model;

transmitting the formatted request and the formatted context data to the selected AI model;

receiving a response from the AI model; and transmitting the response to a requester.

17. The one or more non-transitory computer readable media of claim 16, wherein selecting the AI model comprises:

retrieving client-defined parameters from a configuration database;

identifying eligible AI models from an AI models register based on the client-defined parameters;

evaluating the eligible AI models based on real-time availability and performance metrics; and selecting an optimal AI model from the eligible AI models based on the evaluation.

18. The one or more non-transitory computer readable media of claim 16, wherein retrieving the context data relevant to the request comprises:

analyzing context requirements for the request;

retrieving the context data from multiple data sources comprising at least two of: a short-term memory store, a long-term memory store, or an internal knowledge base;

aggregating the context data; and formatting the context data for the selected AI model before transmitting the request.

19. The one or more non-transitory computer readable media of claim 16, the operations further comprising:

monitoring performance metrics of the selected AI model in fulfilling the request;

updating an AI models register with the performance metrics;

determining if the performance metrics meet predefined thresholds; and adjusting future AI model selection based on the performance metrics.

20. The one or more non-transitory computer readable media of claim 16, the operations further comprising, wherein selecting the AI model comprises:

filtering a set of AI models based on compatibility with the tasks to exclude AI models lacking required capabilities; and ranking the filtered AI models using a scoring function that weights task-specific performance criteria.

* * * * *